United States Patent [19]

Tanaka et al.

[11] Patent Number: 5,765,369
[45] Date of Patent: Jun. 16, 1998

[54] EXHAUST GAS PURIFYING APPARATUS

[75] Inventors: Masakazu Tanaka, Okazaki; Hiroshi Mori, Ichinomiya; Mamoru Mabuchi; Hiroyuki Usami, both of Kariya; Kinji Hodaira, Okazaki, all of Japan

[73] Assignee: Nippondenso Co., Ltd., Aichi-pref, Japan

[21] Appl. No.: 508,090

[22] Filed: Jul. 27, 1995

[30] Foreign Application Priority Data

Jul. 27, 1994 [JP] Japan .................................. 6-196124
Feb. 14, 1995 [JP] Japan .................................. 7-050629

[51] Int. Cl.$^6$ ........................................................ F01N 3/28
[52] U.S. Cl. ........................................... 60/277; 60/297
[58] Field of Search .............................. 60/274, 297, 277

[56] References Cited

U.S. PATENT DOCUMENTS

| 5,264,186 | 11/1993 | Harada et al. | 60/300 |
| 5,589,143 | 12/1996 | Mori | 60/297 |

FOREIGN PATENT DOCUMENTS

| 0588315 | 3/1994 | European Pat. Off. . |
| 2-135126 | 5/1990 | Japan . |
| 4-17710 | 1/1992 | Japan . |
| 4-60108 | 2/1992 | Japan . |
| 4-311618 | 11/1992 | Japan . |
| 5-149130 | 6/1993 | Japan . |
| 5-256124 | 10/1993 | Japan . |
| 6-66130 | 3/1994 | Japan . |
| 6-101452 | 4/1994 | Japan . |

*Primary Examiner*—Douglas Hart
*Attorney, Agent, or Firm*—Cushman, Darby & Cushman IP Group of Pillsbury Madison & Sutro LLP

[57] ABSTRACT

An exhaust gas purifying apparatus with a failure diagnosis function is provided. A failure diagnosis device determines that the apparats is failed when the temperature rising speed of an adsorbing device is equal to a set value or less during a gas adsorption process and if the temperature rising speed is equal to an upper limit or more or to a lower limit or less during a gas desorption process. Further, a failure diagnosis device similarly monitors the flow passing through the adsorbing device. A failure diagnosis device determines that the apparatus is failed if the concentration of discharge gas is equal to a set value or more in a discharge passage. And further, a failure diagnosis device measures the concentration of discharge gas flowing through a return passage to accumulate the amount of discharge gas in order to determine that the apparatus is failed if the accumulated value is equal to a set value or less. Exhaust gas sensors are installed in the return passage and the upstream side of the adsorbing device, respectively, and the period of time te from the activation of the return passage until the outputs from the exhaust gas sensors match or a correlation coefficient for these outputs is measured to diagnose failures in the apparatus.

23 Claims, 30 Drawing Sheets

LEAD VALVE TROUBLE

EXHAUST GAS PURIFYING APPARATUS

CROSS REFERENCE TO RELATED APPLICATIONS

This application is based upon and claims priority from Japanese Patent Application No. Hei 6-196124 filed Jul. 27, 1994 and Japanese Patent Application No. Hei 7-50629 filed Feb. 14, 1995, with the contents of each document being incorporated herein by reference.

BACKGROUND OF THE INVENTION

1. Field of the Invention

The present invention relates to an exhaust gas purifying apparatus.

2. Description of the Related Art

Methods for purifying exhaust gas from automobiles includes exhaust gas purifying methods using a catalyst device carrying rare metal (platinum or rhodium) as a catalyst.

The purification of HC with such a method generally requires a catalyst activation temperature of 350° C. or higher. Only a small amount of HC, however, is purified immediately after the engine has been started because the catalyst has not reached its activation temperature.

To solve the above problem, exhaust gas purifying apparatuses have been proposed wherein a catalyst device is disposed in an exhaust system for an engine and wherein an HC trapper containing an adsorbent for adsorbing HC discharged while the engine is cold (hereafter referred to as "cold HC") is disposed on the upstream or downstream side of the catalyst device (Japanese Patent Application Laid-Open No. 4-17710, Japanese Patent application Laid-Open No. 4-311618, Japanese Patent application Laid-Open No. 5-149130, Japanese Patent application Laid-Open No. 5-256124, Japanese Patent Application Laid-Open No. 6-101452).

Exhaust gas purifying apparatuses according to Japanese Patent application Laid-Open No. 4-17710 and Japanese Patent application Laid-Open No. 4-311618 dispose an HC trapper containing an adsorbent on the downstream side of the catalyst device in parallel to a main passage, and installs a passage switching valve in both an adsorption passage including the HC trapper and the main passage.

The passage switching valve is operated for a specified period of time immediately after the start of the engine in order to pass exhaust gas to the adsorption passage, while cold HC is simultaneously adsorbed by the HC trapper.

During high temperatures when cold HC is released from the adsorbent, the passage switching valve is operated to pass exhaust gas to the main passage, while a negative pressure from an inlet pipe for the engine simultaneously acts on an HC desorption pipeline that connects the downstream side of the HC trapper to the inlet pipe, thereby causing desorbed HC to be sucked into the inlet pipe and burned again in the engine.

Japanese Patent application Laid-Open No. 4-311618 describes a method for compulsorily returning desorbed HC to the upstream side of a catalyst using a suction pump.

Exhaust gas purifying apparatuses according to Japanese Patent application Laid-Open No. 5-149130 and Japanese Patent application Laid-Open No. 5-256124 dispose on the upstream side of a catalyst device an adsorbing device using a zeolite adsorbent, and employs both the adsorbing and catalyst devices to cause the adsorbent to adsorb cold HC when the temperature of exhaust gas is low, while causing the catalyst device to purify both HC desorbed from the adsorbent and HC exhausted from the engine when the temperature of exhaust gas is high.

Exhaust gas purifying apparatuses according to Japanese Patent application Laid-Open No. 6-101452 dispose a bypass passage having an adsorbing device and a main passage with no adsorbing device at downstream of a catalyst. Exhaust temperature sensors are disposed at inlet and outlet of the adsorbing device. In case that a temperature of exhaust gas is low, adsorbing heat value, when noxious component is adsorbed by the adsorbent, is detected, thereby when the adsorbing heat value does not reach a target value, a adsorbing device is determined to be failure.

The conventional exhaust gas purifying apparatuses, however, have the following problem:

They do not have a unit for detecting when an adsorbent is degraded or when the switching of the passages does not work properly.

The exhaust gas purifying apparatus is thus operated even after a failure has occurred therein, resulting in discharge of toxic gases. Since an exhaust purifying apparatus in Japanese Paten Application Laid-Open 6-101452 has a device diagnosing failure, the above problem can be avoided. The exhaust purifying apparatus can diagnose degradation and failure of the adsorbent itself, however, can not diagnose failure of valves in return passage to return adsorbed toxic component to the upstream of the catalyst and movable apparatus portion in the apparatus.

In view of this problem, this invention provides an exhaust gas purifying apparatus that has a function for self-diagnosing failures in the apparatus as well as good exhaust gas purifying characteristics.

SUMMARY OF THE INVENTION

In one preferred mode of the present invention, an exhaust gas purifying apparatus for purifying an exhaust gas discharged from an engine includes: a catalyst disposed downstream of the engine for purifying toxic components in the exhaust gas; an adsorbing passage disposed downstream of the catalyst; a main passage disposed downstream of the catalyst and parallel to the adsorbing passage; a discharge passage disposed downstream of the adsorbing passage and the main passage;

an adsorbing device disposed in the adsorbing passage for adsorbing toxic components in the exhaust gas flowing in the adsorbing passage; a switching unit for selectively switching exhaust gas to flow one of the adsorbing passage and the main passage; a return passage branched from the adsorbing passage and connected the adsorbing passage to an upstream side of the catalyst for returning the toxic components desorbed from the adsorbing device to the upstream side of the catalyst; a mode control unit for controlling the switching unit to generate an adsorption mode in which the adsorbing passage is opened and the adsorbing device adsorbs the toxic components and a release mode in which the main passage is opened and the adsorbing device desorbes the toxic components to flow the desorbed toxic components into the return passage; a measuring unit for measuring a physical value in the exhaust gas at the adsorbing device or at downstream of the adsorbing device; a determination unit for comparing the physical value with a predetermined physical value and determining an abnormal status of the adsorbing device and the switching unit.

In another preferred mode of the invention, the exhaust gas purifying apparatus includes the measuring unit measures an exhaust gas temperature in the exhaust gas during the adsorbing mode, or measures a concentration of the toxic components in the exhaust gas during the adsorbing mode.

In still another preferred mode of the invention, the exhaust gas purifying apparatus includes the measuring unit measures a concentration of the toxic components in the exhaust gas during the releasing mode.

In further preferred mode of the invention, the measuring unit disposed in the return passage measures a concentration of the toxic components in the return passage during the adsorbing mode.

In another preferred mode of the invention, the measuring unit measures an exhaust gas flow in the exhaust gas during the adsorbing mode.

The operation and effects are described.

When the temperature of exhaust is low, the passages are in the adsorbing mode, and all the exhaust flows from the adsorbing passage into the discharge passage. Thus, those toxic components such as HC (hydrocarbon) which are not purified by the catalyst device due to the low temperature of exhaust are adsorbed by an adsorbing device (a toxic gas adsorption process). Consequently, toxic discharge gas is not discharged outside.

When exhaust becomes hot, however, the passages are placed into the releasing mode, and the exhaust constitutes two flows one of which is discharged outside via the second main passage through the discharge passage (a toxic gas desorption process). Since the exhaust is very hot, toxic discharge gas is purified by the catalyst device.

The other flow of exhaust flows into the return passage from the adsorption passage. This flow of hot exhaust causes discharge gas adsorbed by the adsorbing device to be desorbed and delivered to upstream side of the catalyst device via the return passage. The discharge gas is then purified by the catalyst device.

As described above, discharge gas from the engine is prevented from being discharged outside by switching the passage opening and closing unit between the first and second operation states depending upon the temperature of exhaust. This serves to provide an exhaust gas purifying apparatus with good exhaust gas purifying characteristics.

In one preferred mode of the invention, the failure diagnosis device measures the temperature of the adsorbing device to calculate the velocity of an increase in this temperature $V_r$. The velocity $V_t$ can be easily calculated by, for example, differentiating a measured value of the temperature.

It is known that the velocity $V_r$ of an increase in the first operation state gradually decreases as a leakage flow $Q_a$ (FIG. 4) that does not pass through the adsorption passage increases, as shown in FIG. 5.

The determination of $V_r$ thus enables the magnitude of the leakage flow $Q_a$ to be determined.

That is, if $V_t$ is equal to a specified value $V_{to}$ or less, it can be determined that the leakage flow $Q_a$ from the passage opening and closing unit is at least equal to a set value $Q_{ao}$ or more, as shown in FIG. 5.

A large leakage flow $Q_a$ indicates that there is a large amount of discharge gas discharged without being adsorbed by the adsorbing device, as shown by the broken line in FIG. 4. If the leakage flow $Q_a$ exceeds the specified value $Q_{ao}$, it can be determined that the exhaust gas purifying apparatus is failed.

In the second operation state, the temperature rising speed $V_{td}$ varies relative to a leakage flow $Q_d$ (FIG. 4) from the adsorption passage to the discharge passage, as shown in FIG. 6.

Thus, if the temperature rising speed $V_{td}$ is equal to an upper limit $V_{t1}$ or more, it can be determined that the leakage flow $Q_d$ has exceeded the upper limit of the leakage flow $Q_{do}$. This in turn enables the determination that a failure has occurred in the apparatus during the toxic gas desorption process.

This is because a large amount of the leakage flow $Q_d$ indicates that discharge gas desorbed from the adsorbing device is discharged outside via the discharge passage.

A failure such as a blockage may occur in a reflux passage from the adsorption passage through the return passage to the upstream side of the catalyst device during the toxic gas desorption process, resulting in a decrease in a return flow $Q_r$ (FIG. 4).

When the reflux flow $Q_r$ decreases, the temperature rising speed $V_{td}$ decreases, as shown in FIG. 7.

Thus, if the temperature rising speed $V_{td}$ is equal to a lower limit $V_{t2}$ or less, it can be determined that the reflux flow $Q_r$ is too small ($Q_r \leq Q_{ro}$), that is, the apparatus is failed.

This is because discharge gas desorbed from the adsorbing device cannot be purified by the catalyst device and leaks outside together with exhaust if the return flow $Q_r$ is insufficient.

As described above, by monitoring the temperature rising speed $V_r$, $V_{td}$ as described above, the failure diagnosis device according to this invention can self-diagnose failures in the apparatus such as leakage from the exhaust passage or the blockage thereof to constantly retain good exhaust gas purifying characteristics.

This mode of the invention can thus provide an exhaust gas purifying apparatus that has a self-diagnosis function as well as good exhaust gas purifying characteristics.

Other preferred modes of the failure diagnosis units are described later.

DETAILED DESCRIPTION OF THE PREFERRED EMBODIMENTS

[Embodiment 1]

An exhaust gas purifying apparatus according to an embodiment of the first invention is described with reference to FIGS. 1 to 7.

Figure 1:
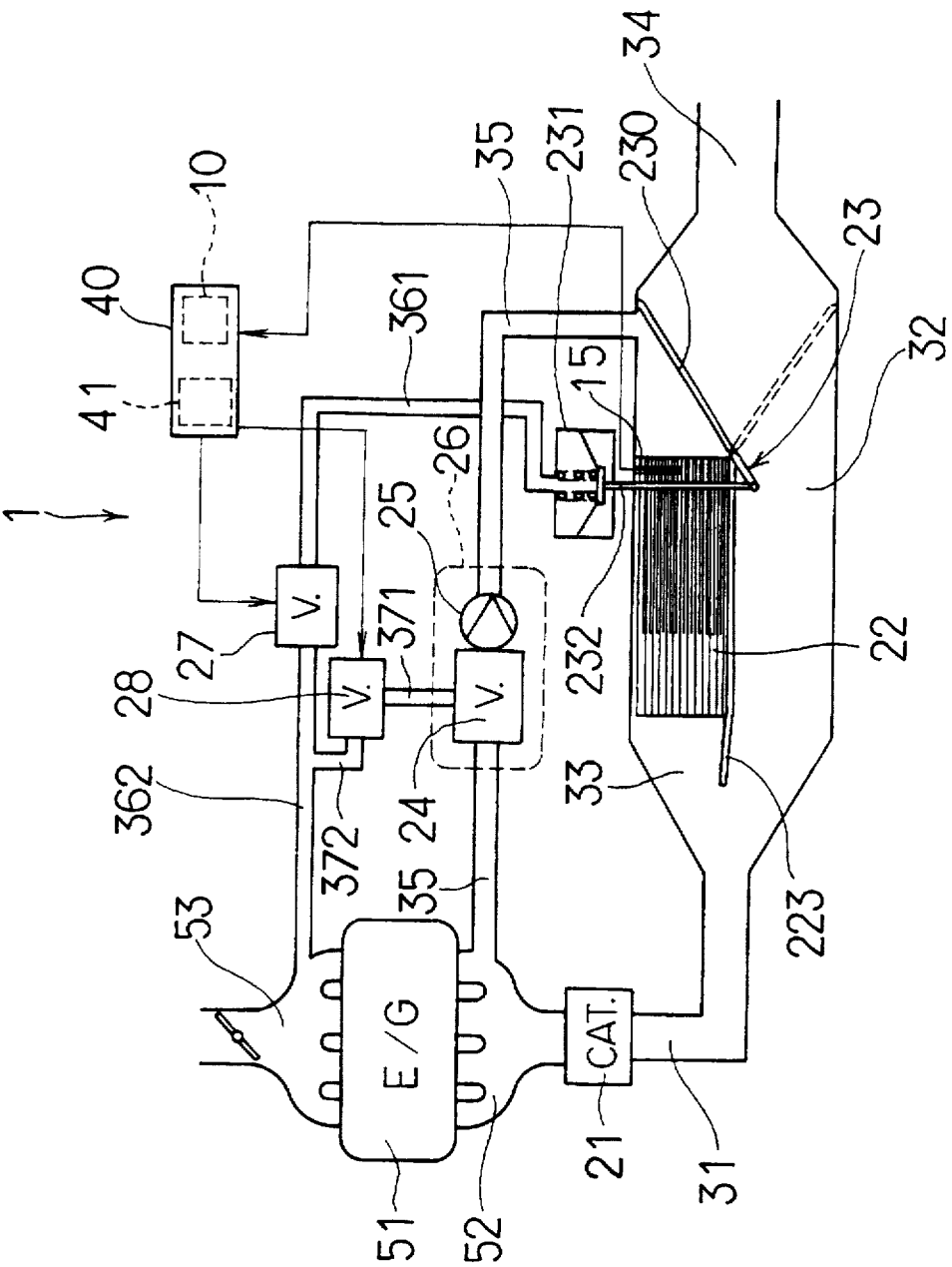
FIG. 1 is a system block diagram of an exhaust gas purifying apparatus according to Embodiment 1.

This embodiment is an exhaust gas purifying apparatus 1 for an automobile which is provided in an exhaust passage for an engine 51 as shown in FIG. 1.

The exhaust gas purifying apparatus 1 has a first main passage 31 including a catalyst device 21 located on the upstream side of the exhaust passage for purifying exhaust gas; an adsorption passage 33 including an adsorbing device 22 located on the downstream side of the first main passage 31 for adsorbing toxic gas; a second main passage 32 located on the downstream side of the first main passage 31 so as to form a passage in parallel to the adsorption passage 33; a discharge passage 34 located to communicate with the adsorption passage 33 and the second main passage 32 at their downstream ends; a return passage 35 that forms a passage branching from the adsorption passage 33 and extending to the upstream side of the catalyst device 21; passage opening and closing units 23, 24 for opening and closing the passages 32, 33, 35; a controller 41 for controlling the passage opening and closing unit 23, 24; and a failure diagnosis device 10 for self-diagnosing falures in the apparatus.

The return passage 35 has a one-way valve 25 for allowing only the flow of exhaust from the adsorption passage 33 to the upstream side of the catalyst device 21.

When the temperature of exhaust is low, the controller 41 places the passage opening and closing unit 23, 24 into a first operation state, thereby closing the return passage 35 to pass to the discharge passage 34 exhaust that has passed through the adsorption passage 33 and blocking the flow of exhaust from the second main passage 32 to the discharge passage 34.

When the temperature of exhaust is high, the controller 41 places the passage opening and closing unit 23, 24 into a second operation state, thereby passing exhaust from the second main passage 32 to the discharge passage 34, opening the return passage 35 to pass to the return passage 35 exhaust that has passed through the adsorption passage 33, and blocking the flow of exhaust from the adsorption passage 33 to the discharge passage 34.

The failure diagnosis device 10 has a determination unit for measuring the temperature of the adsorbing device 22 to determine that the apparatus is failed if in the first operation state, a temperature rising speed $V_r$ is equal to a set value $V_{r0}$ or less and if in the second operation state, the temperature rising speed $V_r$ is equal to a specified upper limit $V_{r1}$ or more or to a specified lower limit $V_{r2}$ or less.

Each component is further described below.

As shown in FIG. 1, the catalyst device 21 is disposed immediately after an exhaust manifold 52 in an exhaust pipe of the engine 51. A large diameter portion is disposed on the downstream side of the catalyst device 21 in the exhaust pipe, and both the adsorption passage 33 in which the adsorbing device 22 is housed and the second main passage 32 are formed in the large diameter portion.

Figure 2:
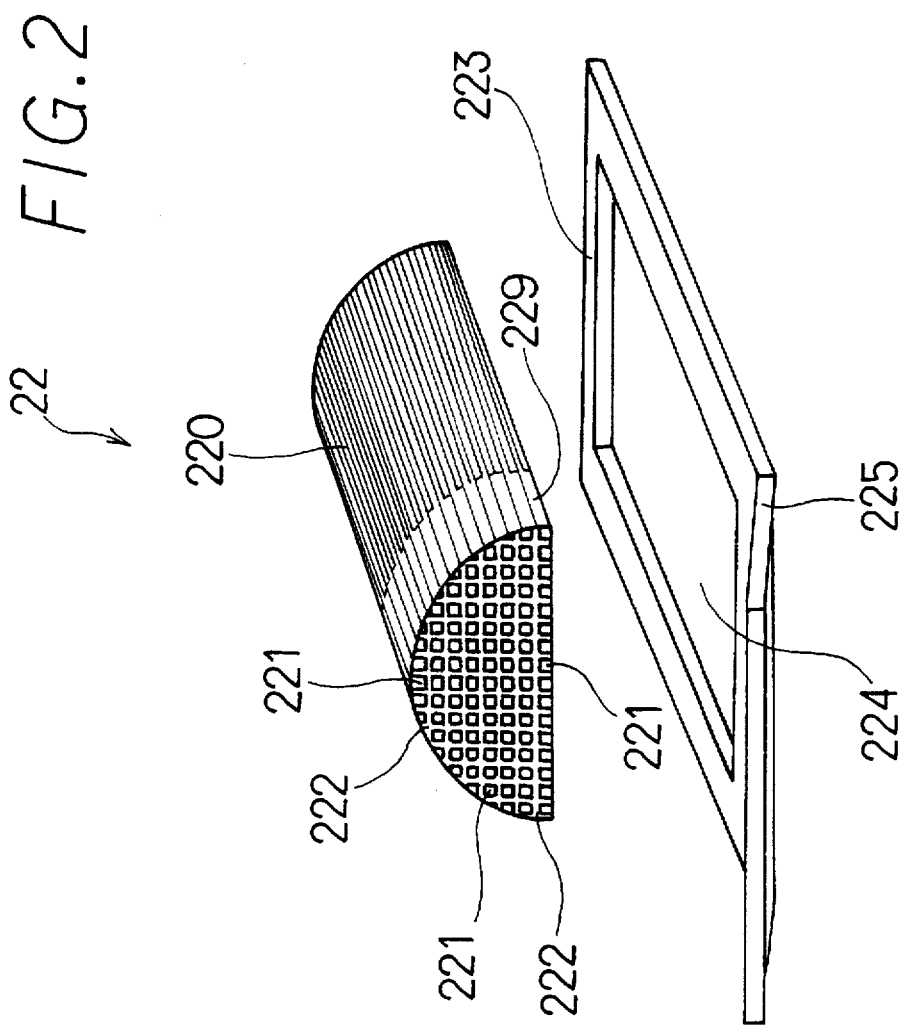
FIG. 2 is an exploded perspective view of an adsorbing device according to Embodiment 1.

The adsorbing device 22 comprises stainless steel or ceramic such as cordierite, and has a semi-cylindrical shape fitting the diameter of the large diameter portion. The adsorbing device 22 has a large number of parallel through holes 221, and its adsorbent carrying layer 222 carries a zeolite adsorbent, as shown in FIG. 2.

The adsorbing device 22 may be elliptic or square depending upon the shape of the large diameter portion.

A first passage opening and closing unit 23 is disposed immediately after the rear end of the adsorbent carrying layer 222 of the adsorbing device 22, as shown in FIG. 1.

The distance between the catalyst device 21 and the adsorbing device 22 is set so that the timing with which the catalyst device 21 reaches its activation temperature when heated by exhaust gas matches the timing with which the adsorbent carried by the adsorbing device 22 loses its adsorbing function when heated.

The adsorbing device 22 is separated from the second main passage 32 by a partition wall 223, and also retained by the partition wall 223. An opening 224 is formed in the partition wall 223, as shown in FIG. 2.

In addition, as shown in FIG. 2, a straightening vane 225 is disposed on the upstream side of the adsorbing device 22 to uniform the flow distribution of exhaust gas flowing through the adsorbing device 22 in order to improve the adsorption efficiency.

The partition wall 223 and the straightening vane 225 may be integrated as shown in FIG. 2 or separated from each other.

A temperature sensor 15 constituting the failure diagnosis device 10 is disposed within the adsorbing device 22 to monitor the temperature of the adsorbing device 22, as shown in FIG. 1. The temperature sensor 15 may be installed anywhere in the adsorbing device 22 as long as it is located inside the device. It may also be disposed behind the adsorbing device 22 and in front of the passage opening and closing unit 23.

A return passage 35 branches from passage 33 ion passage 33 near its rear end, and has a reed valve 26 in which a one-way valve 25 for restraining the flow of exhaust within the pipe to one direction and a second passage opening and closing unit 24 are integrated. The return passage 35 is in communication with the exhaust manifold 52.

The first passage opening and closing unit 23 has an actuator 231 connected to its blade 230 via a shaft 232. The actuator 231 is connected to a surge tank 53 on the upstream side of the engine 51 via inlet pipes 361, 362 for supplying a negative pressure for operating the actuator 231. A first solenoid valve 27 is disposed between the inlet pipes 361 and 362.

The one-way valve 25 allows only the flow of exhaust passing from the return passage 35 to the upstream side of the catalyst device 21.

The second passage opening and closing unit 24 is operated by a diaphragm that operating at a negative pressure, and is in communication with an inlet pipe 362 connecting the first solenoid valve 27 to the surge tank 53, via inlet pipes 371, 372 for supplying a negative pressure to the unit 24. A second solenoid valve 28 is installed between the inlet pipes 371 and 372.

Figure 3:
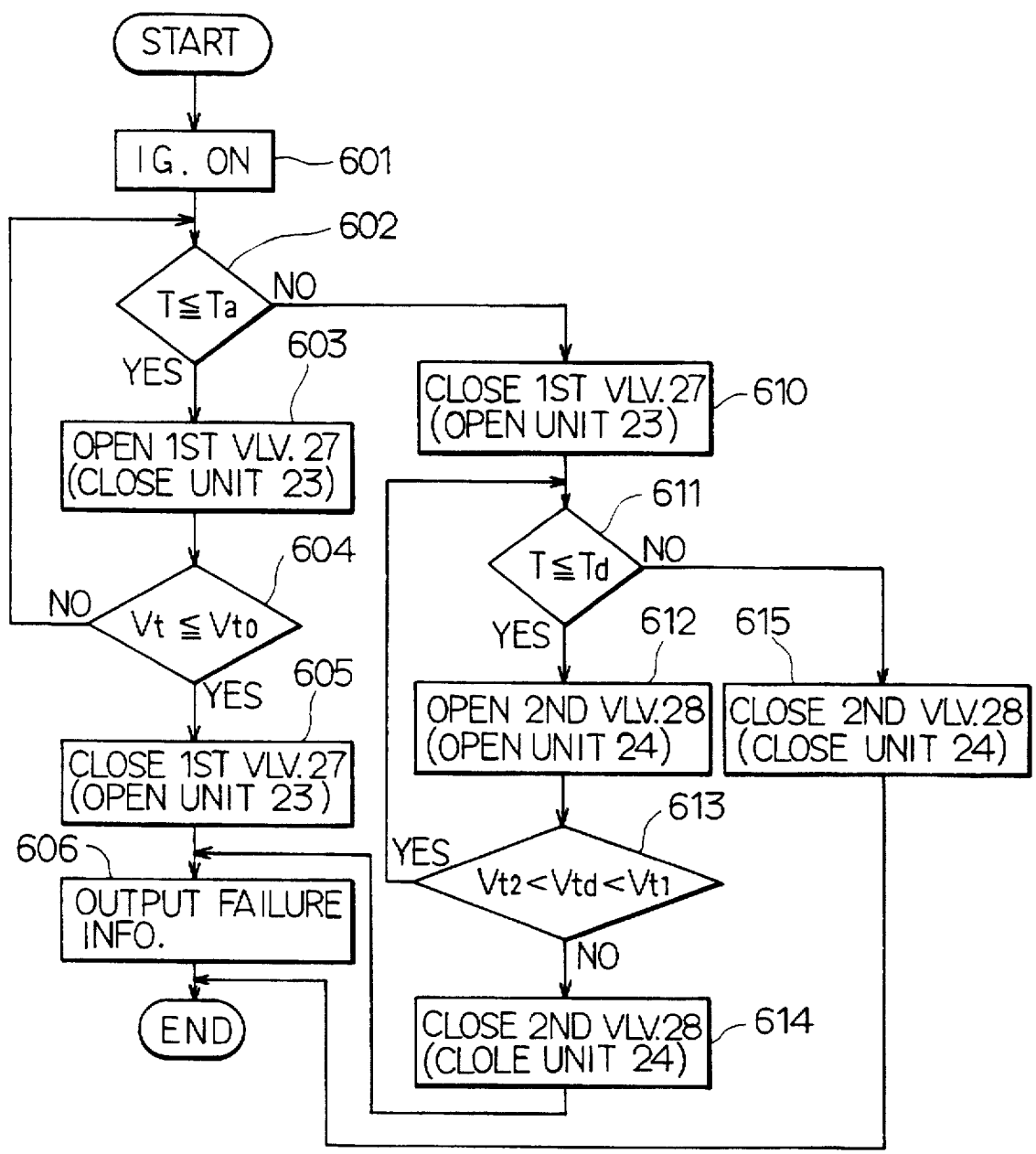
FIG. 3 is a flowchart showing control and failure diagnosis in the exhaust gas purifying apparatus according to Embodiment 1.

The controller 41 comprises a microcomputer 40 and a control program shown in FIG. 3, and receives signals from the engine 51 and the temperature sensor 15 to control the opening and closing of the solenoid valves 27, 28 according to operation states in order to control the passage opening and closing unit 23, 24.

The failure diagnosis device 10 comprises the microcomputer 40 and a failure diagnosis program shown in FIG. 3.

Next, the operation of the failure diagnosis unit 10 is described with reference to FIG. 1 and the flowchart in FIG. 3.

At step 601 in FIG. 3, the process confirms that the engine has been started (the ignition switch (IG) has been turned on), and then proceeds to step 602. At step 602, a signal is received from the temperature sensor 15, and the value of a temperature T contained in the signal is checked to determine whether or not the adsorbing device 22 is ready for adsorption.

For the cold start of the engine, the adsorbing device 22 is cold, and if the temperature T (°C.) is equal to an adsorbable temperature (the temperature activates the adsorbent) $T_a$ (°C.) or below, the process proceeds to an adsorption process starting at step 603. At step 603, the first solenoid valve 27 is opened to allow the inlet pipes 361, 362 to communicate with each other. This causes a negative pressure in the surge tank 53 to act on the actuator 231 via the inlet pipes 362, 361 to pull the shaft 232, thereby placing the first passage opening and closing unit 23 into the position shown by the broken line in FIG. 1 (the passage opening and closing unit 23 is closed).

Immediately after the cold start of the engine 51, the temperature of exhaust gas is low, and the engine 51 discharges exhaust gas containing a large amount of cold HC. While the exhaust gas temperature is low, the catalyst device 21 does not reach its activation temperature, thus cold HC virtually flows through the first main passage 31 without being purified by the catalyst device 21.

This exhaust gas flow passes from a non-adsorbent-carrying layer 229 in the adsorbing device 22 which does not carry zeolite (FIG. 2) to an adsorbent carrying layer 220 that carries zeolite, where the cold HC is adsorbed by the adsorbent. The exhaust gas free from the cold HC is then emitted to the atmosphere via the discharge passage 34.

In the meantime, the straightening vane 225 straightens the flow of exhaust gas, so the exhaust gas has a uniform flow distribution when it flows through the adsorbing device 22.

Figure 4:
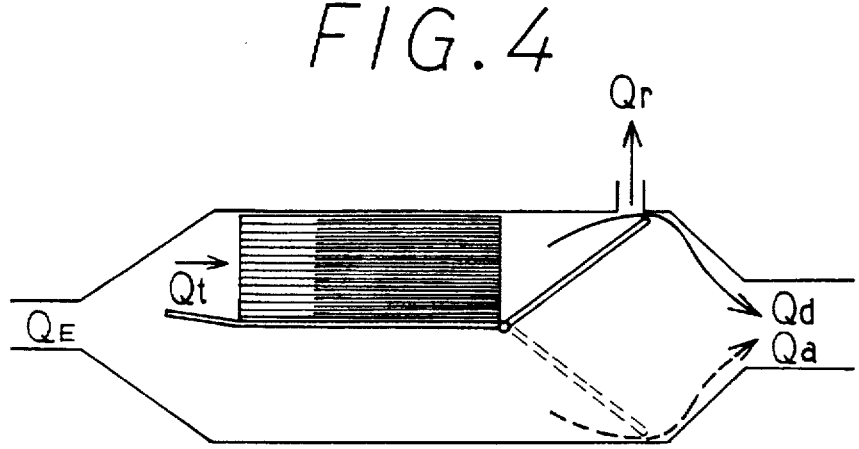
FIG. 4 shows the flow of exhaust around the adsorbing device in the exhaust gas purifying apparatus according to Embodiment 1.

While the cold HC is being adsorbed as described above, the adsorbing device 22 is heated by the exhaust gas. At this point, if a leakage flow $Q_a$ from the passage opening and closing unit 23 increases as shown in FIG. 4, the amount of exhaust gas flowing into the adsorbing device 22 decreases, resulting in a small temperature rising speed $V_t$ of the exhaust gas.

Figure 5:
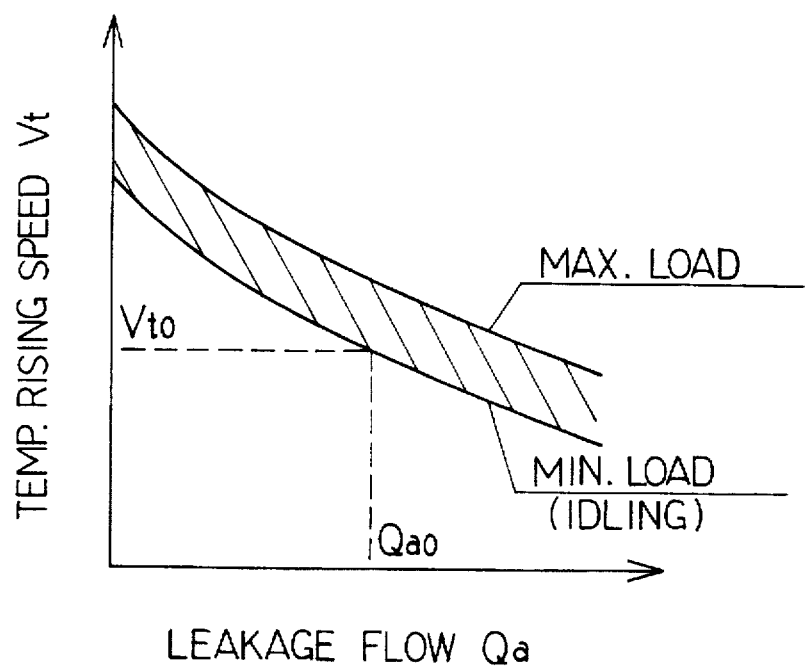
FIG. 5 is a graph describing the relationship between the temperature rising speed and leakage flow $Q_a$ during an adsorption process in the exhaust gas purifying apparatus according to Embodiment 1.

As a result, the temperature rising speed $V_t$ in the adsorbing device 22 is smaller than when there is no leakage flow $Q_a$, as shown in FIG. 5.

The temperature rising speed $V_t$ can be calculated from a signal from the temperature sensor 15. The leakage flow $Q_a$ increases when the actuator 231, shaft 232, or blade 230 is damaged, and if it exceeds its allowable value $Q_{a0}$, the temperature rising speed $V_t$ in the adsorbing device 22 becomes equal to its allowable value $V_{t0}$ or less.

The amount of cold HC adsorbed thus decreases to degrade the overall purification performance. This failure can be determined by detecting when $V_t$ becomes smaller than $V_{t0}$, as shown in FIG. 5.

That is, at step 604, if the temperature rising speed $V_t$ is equal to $V_{t0}$ or less, it is determined that the exhaust gas purifying apparatus 1 is failed. At step 605, the first solenoid valve 27 is closed to initiate a second operation state (a normal and steady operation state). At step 606, a failure information is output.

The above sequence of processing enables the determination of whether or not the apparatus is failed during a toxic gas adsorption process.

When the engine 51 has warmed up and if the temperature T exceeds the HC adsorbable temperature $T_a$ for the adsorbing device 22 at step 602, the process proceeds to step 610 to close the first solenoid valve 27.

This blocks the supply of a negative pressure to the actuator 231, which then pushes the shaft 232 due to the elastic force of its built-in spring.

The first passage opening and closing unit 23 is then placed into the position shown by the solid line (in which the passage opening and closing unit 23 is opened). The passage for exhaust gas is then switched, and the exhaust gas starts to flow through the second main passage 32 that does not have an adsorbing device 22.

By this point of time, the catalyst device 21 has reached its activation temperature. The HC in the exhaust gas is thus purified by the catalyst device 21, and exhaust gas virtually containing no HC is emitted to the atmosphere from the second main passage 32 through the discharge passage 34.

From step 611 through 613, the following operation is performed until the temperature T of the adsorbing device 22 exceeds a desorption finish temperature $T_d$.

That is, the process starts reading a value from the temperature sensor 15 to monitor the temperature T of the adsorbing device 22 immediately after the first solenoid valve 27 has been closed. At step 611, if the temperature T is equal to $T_d$ or less, the process proceeds to step 612 to open the second solenoid valve 28.

This in turn causes the inlet pipes 371 and 372 to communicate with each other to supply a negative pressure from the surge tank 53 to the second passage opening and closing unit 24, thereby opening the passage opening and closing unit 24.

On one side of the adsorbing device 22, the exhaust gas which has already become very hot is flowing through the second main passage 32. The exhaust gas of such a temperature contacts the adsorbent carrying layer 220 of the adsorbing device 22 through an opening 224 in the partition wall 223 which is shown in FIG. 2.

This configuration serves to appropriately transfer the heat of the exhaust gas to the adsorbent carrying layer 220 to increase the temperature of the adsorbent, thereby facilitating the desorption of HC.

At this point, since the passage opening and closing unit 24 is open, exhaust pulses generated within the exhaust manifold 52 are transmitted via the return passage 35 to the one-way valve 25, which is intermittently opened.

This causes HC desorbed from the adsorbent of the adsorbent carrying layer 220 of the adsorbing device 22 to flow into the exhaust manifold 52 through the return passage 35. The HC is then purified by the catalyst device 21 together with the HC in exhaust gas from the engine 51.

Figure 6:
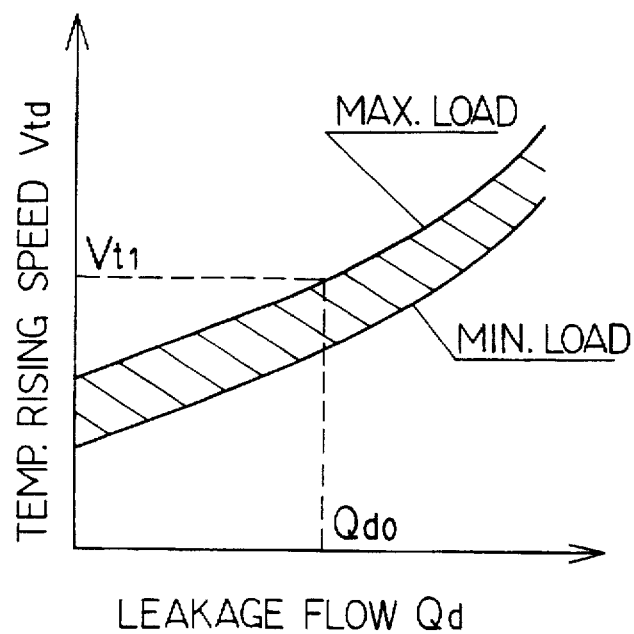
FIG. 6 is a graph describing the relationship between the temperature rising speed and leakage flow $Q_d$ during a desorption process according to Embodiment 1.

If the leakage flow $Q_d$ (FIG. 4) from the passage opening and closing unit 23 is equal to an allowable value $Q_{d0}$ or more as shown in FIG. 6, the temperature rising speed $V_{td}$ of the adsorbing device 22 is equal to an allowable value $V_{t1}$ or more.

That is, if the actuator 231, shaft 232, and blade 230 is damaged, the leakage flow $Q_d$ exceeds its allowable value $Q_{d0}$, and exhaust gas of a larger amount than usual flows through the discharge passage 34.

In addition, the amount of HC returning to the catalyst device 21 decreases to degrade the overall purification performance. This can be determined by detecting when $V_{td}$ is equal to $V_{t1}$ or more, as shown in FIG. 6. That is, it can be determined that the apparatus is failed when the result of the determination in step 613 is negative.

In addition, even when the actuator 231, shaft 232, and blade 230 in the passage opening and closing unit 23 are operating correctly, the flow of exhaust gas $Q_r$ (FIG. 4) returning to the catalyst device 21 decreases if a failure occurs in the reed valve 26.

The heat transfer to the adsorbing device 22 is then degraded, resulting in a decrease in $V_{td}$.

Figure 7:
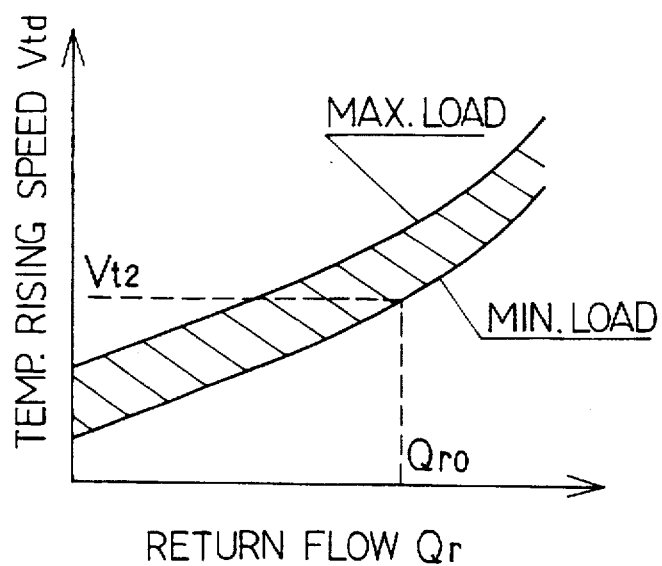
FIG. 7 is a graph describing the relationship between the temperature rising speed and return flow $Q_r$ during the desorption process according to Embodiment 1.

That is, when the return flow $Q_r$ becomes equal to its allowable value $Q_{r0}$ or less, the temperature rising speed $V_{td}$ becomes equal to its allowable value $V_{t2}$ or less, as shown in FIG. 7. Consequently, a failure in the reed valve 26 can be determined by detecting when $V_{td}$ becomes equal to $V_{t2}$ or less.

That is, if the result of the determination in step 613 is negative, the second solenoid valve 28 is closed to initiate the regular state at step 614, and information on the failure in the apparatus is output at step 606.

If the conditions specified for step 613 remain met after the passage opening and closing unit 23 has been switched to its open position (shown by the solid line) to initiate the HC desorption and purification process, the temperature soon reaches a value $T_d$ at which the desorption and purification of HC is completed (T>$T_d$) at step 611. At step 615, the second solenoid valve 28 and the passage opening and closing unit 24 are closed to initiate to the regular operation state.

As described above, the exhaust gas purifying apparatus 1 according to this embodiment prevents cold HC from being emitted even while the engine is cold before the catalyst reaches its activation temperature. Both when causing cold HC to be adsorbed by the adsorbent and when causing cold HC to be desorbed and purified, this apparatus 1 can allow the failure diagnosis device 10 to monitor the temperature rising speed $V_t$ of the adsorbing device 22 in order to self-diagnose failures in the apparatus.

As described above, this embodiment can provide an exhaust gas purifying apparatus 1 that has a self-diagnosis function and good exhaust gas purifying characteristics.

[Embodiment 2]

Figure 8:
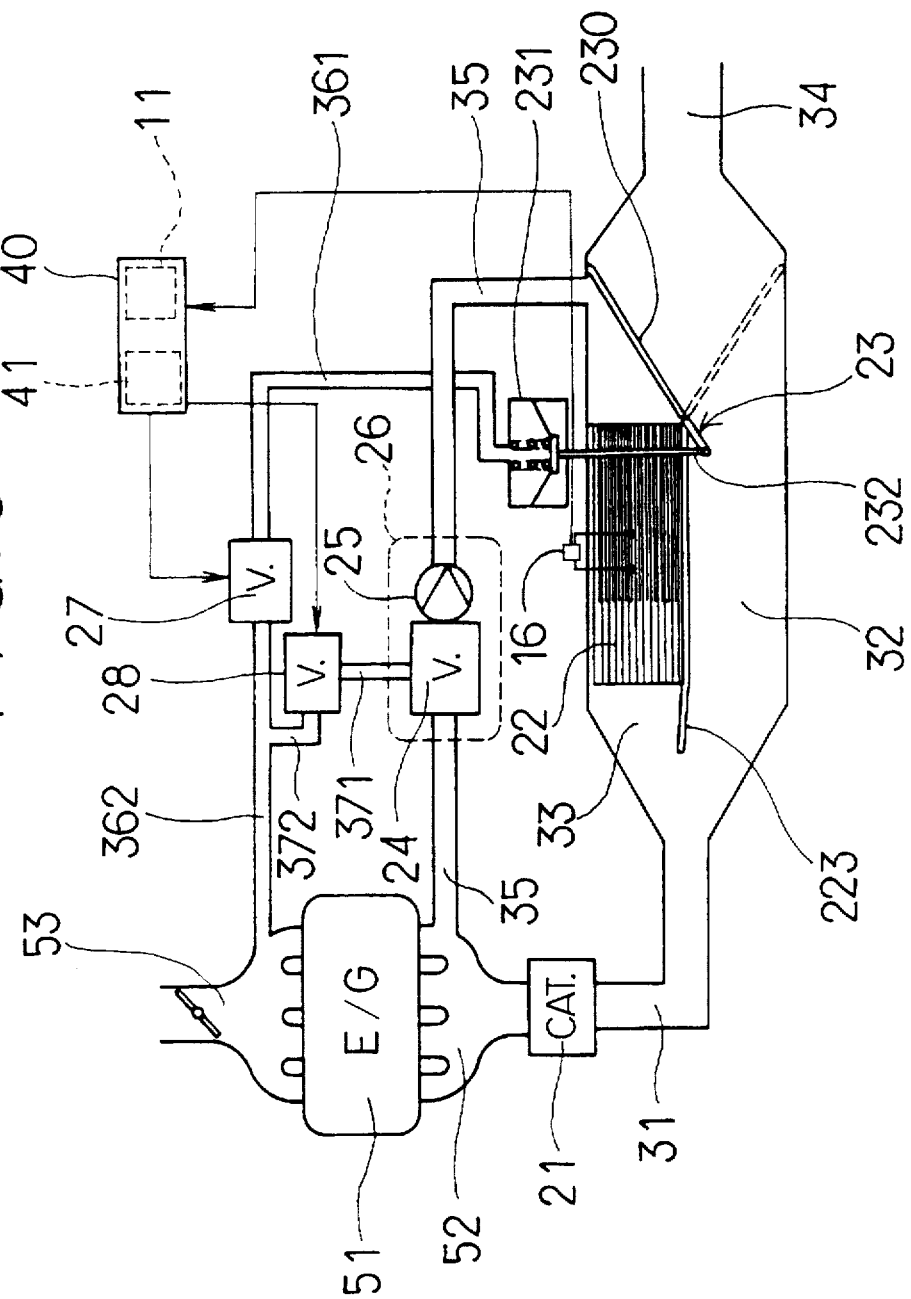
FIG. 8 is a system block diagram of an exhaust gas purifying apparatus according to Embodiment 2.
Figure 9:
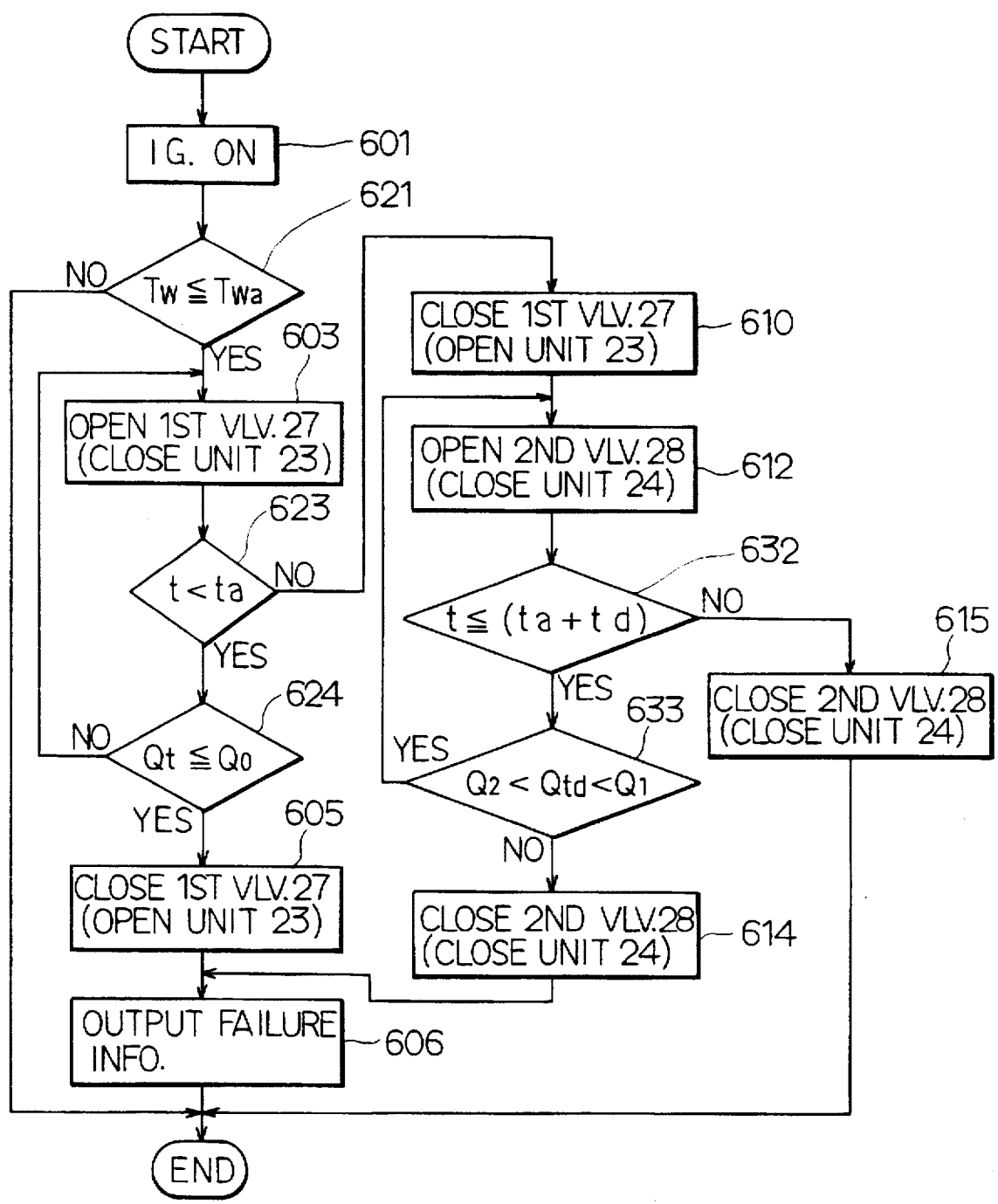
FIG. 9 is a flowchart showing control and failure diagnosis in the exhaust gas purifying apparatus according to Embodiment 2.

This embodiment is similar to Embodiment 1 except that the failure diagnosis device 11 has been replaced according to the second invention, as shown in FIGS. 8 and 9.

That is, as shown in FIG. 8, the failure diagnosis device 11 according to this embodiment has a differential pressure gauge 16 for measuring the difference between the pressure in front of the adsorbing device 22 and the pressure behind the device 22. The differential pressure gauge 16 is used to measure the flow Q, passing through the adsorbing device 22 in order to diagnose failures in the exhaust gas purifying apparatus 1 according to the flowchart for failure diagnosis shown in FIG. 9.

The following description focuses on the difference between Embodiment 1 and this embodiment with reference to the system block diagram in FIG. 8 and the flowchart in FIG. 9.

A manometer (a differential pressure gauge) 16 is disposed inside the adsorbing device 22 to monitor the difference in pressure in exhaust gas flowing through the through holes 221 (FIG. 2) in the adsorbing device 22.

First, at step 601, the engine 51 is started (IG. ON). The controller 41 then receives signals from an engine water temperature sensor and exhaust temperature sensor (not shown) to determine whether the adsorbing device 22 is ready for adsorption.

At step 621, if the value $T_w$ (°C.) of the water temperature sensor is equal to an adsorbable temperature $T_{wa}$ (°C.) or less, the process proceeds to step 603.

At step 603, the first solenoid valve 27 is opened to cause exhaust gas to flow through the adsorbing device 22, in which the cold HC in the exhaust gas is adsorbed.

At the subsequent step 623, the period of time (t) that has passed since the engine was started is checked, and if a specified period of time (ta) has passed, the adsorption process has been completed, and the process proceeds to step 610. A signal from the controller 41 then causes the first solenoid valve 27 to be closed to switch the passage opening and closing unit 23 to the regular position shown by the solid line in the figure. The exhaust gas with its HC purified by the catalyst device 21 already activated due to heat then starts to flow through the second main passage 32. If, however, it has been determined at step 623 that the specified period of time (ta) has not passed, the adsorption process continues. The manometer 16 indicates a difference in pressure because exhaust gas is flowing through the adsorbing device 22 while cold HC is being adsorbed.

Since this difference in pressure has a certain relation with the exhaust gas flow $Q_t$ that has passed through the adsorbing device 22, it can be used to determine the flow $Q_t$.

Figure 10:
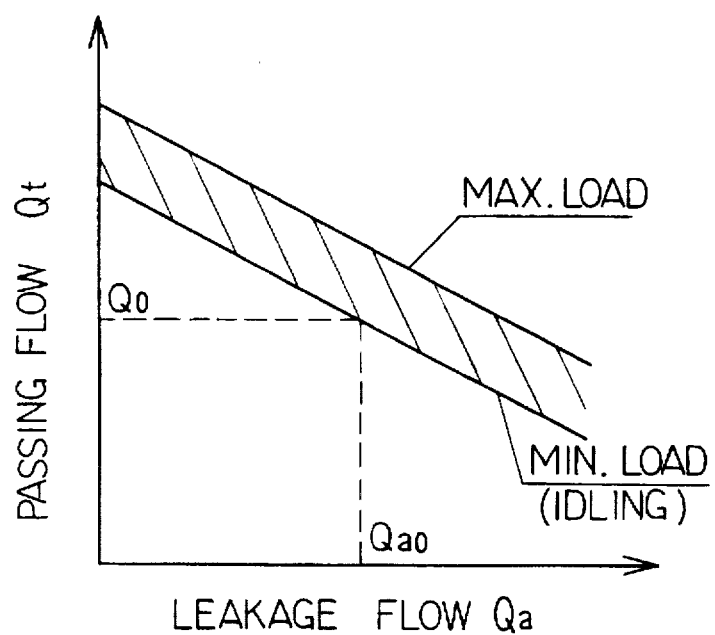
FIG. 10 is a graph describing the relationship between the passing flow and leakage flow $Q_a$ in an adsorbing device during an adsorption process according to Embodiment 2.

When the leakage flow $Q_a$ (FIG. 4) from the passage opening and closing unit 23 increases, $Q_t$ decreases as shown in FIG. 10. This is because the total amount of exhaust gas from the engine $Q_E$ is ($Q_t+Q_a$).

If the actuator 231, shaft 232, or blade 230 is damaged, $Q_a$ becomes equal to its allowable value $Q_{a0}$ or more. $Q_t$ becomes equal to $Q_0$ or less, as shown in FIG. 10, and the amount of cold HC adsorbed decreases to degrade the overall purification performance. That is, if the conditions specified for step 624 are met, it is determined that the exhaust gas purifying apparatus 1 is failed.

If the conditions specified for step 624 are met, the process proceeds to step 605 to close the first solenoid valve 27 in order to initiate the regular state. At step 606, information on the failure in the apparatus is output.

At step 623, however, if the specified period of time (ta) has passed since the engine was started, as described above, the engine has warmed up, and the process proceeds to step 610 to close the first solenoid valve 27 in order to initiate a desorption process, as described above.

At the subsequent step 612, the controller 41 opens the second solenoid valve 28.

As a result, as in Embodiment 1, the second passage opening and closing unit 24 is opened, and the one-way valve 25 is intermittently opened, thereby causing HC desorbed from the adsorbent to flow into the exhaust manifold 52, in which the HC is purified by the catalyst device 21 together with the HC in exhaust gas from the engine 51.

Next, at step 632, the period of time (t) that has passed since the operation was initiated is checked again. If the time (ta+td) required to completely desorb and purify the HC has passed since the second solenoid valve 28 was opened, the process proceeds to step 615 in which the second solenoid valve 28 is closed by a control signal from the controller 41. This in turn causes the first passage opening and closing unit 24 to be closed to complete the sequence of purification steps, and the regular operation state is then initiated.

During the HC desorption and purification process (thus, $t \leq ta+td$), the manometer 16 shows a difference in pressure because reflux exhaust gas is flowing through the adsorbing device 22. This difference in pressure has a value proportional to the exhaust gas flow $Q_{td}$ through the adsorbing device 22. If the leakage flow $Q_d$ (FIG. 4) from the passage opening and closing unit 23 increases, the flow $Q_{td}$ increases, as shown in FIG. 11.

Figure 11:
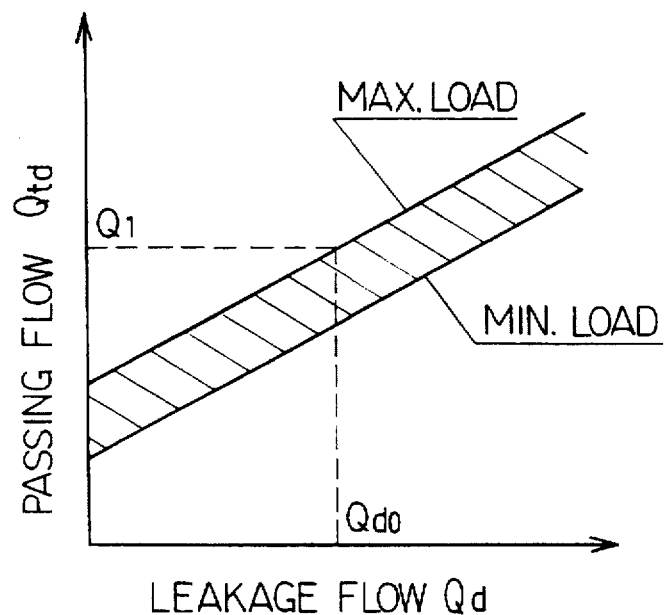
FIG. 11 is a graph describing the relationship between the passing flow and leakage flow $Q_d$ in the adsorbing device during a desorption process according to Embodiment 2.

If the actuator 231, shaft 232, or blade 230 is damaged, $Q_d$ becomes equal to its allowable value $Q_{d0}$ or more, thus the flow $Q_{td}$ becomes equal to $Q_1$ or more, as shown in FIG. 11.

The amount of HC returning through the return passage 35 decreases, thereby degrading the overall purification performance.

Failures in the adsorbing device 22 can thus be diagnosed by monitoring the difference in pressure within the device 22.

That is, at step 633, if the passing flow $Q_{td}$ is equal to $Q_1$ or more during the desorption process, the second solenoid valve (the passage opening and closing unit 24) is closed at step 614, and information on the failure in the apparatus is output at step 606.

Even when the actuator 231, shaft 232, and blade 230 are operating correctly, an exhaust gas flow $Q_r$ (FIG. 4) returning to the catalyst device 21 from the return passage 35 decreases if a failure occurs in the reed valve 26.

Figure 12:
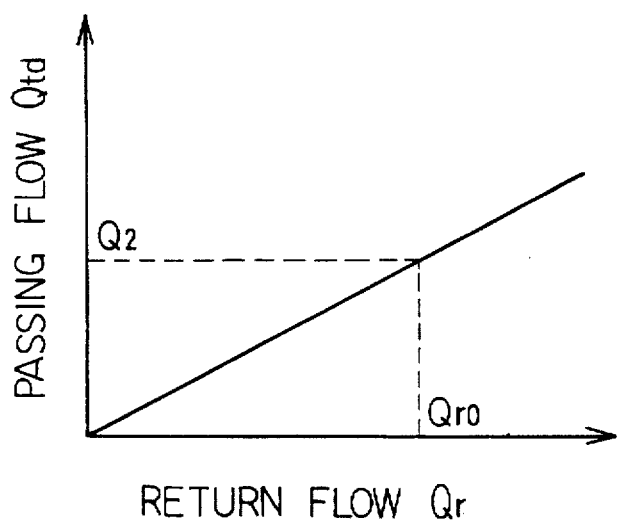
FIG. 12 is a graph describing the relationship between the passing flow and return flow $Q_r$ in the adsorbing device during the desorption process according to Embodiment 2.

On the other hand, if the exhaust gas flow $Q_{td}$ through the adsorbing device 22 is almost equal to the return flow $Q_r$ and if $Q_{td}$ is less than or equal to its allowable value $Q_2$ shown in FIG. 12, the rising of the temperature of the adsorbing device 22 is delayed. Consequently, the desorption or purification is not completed even after a specified period of time (ta+td) to desorb and purify HC has passed.

Thus, failures in the reed valve 26 can also be determined by detecting when the passing flow $Q_{td}$ becomes equal to the set value $Q_2$ or less.

That is, at step 633, if the passing flow $Q_{td}$ is equal to $Q_2$ or less, the process proceeds to steps 614, 606 to output information on the failure in the apparatus.

Since this embodiment measures the flow passing through the adsorbing device 22, leakage from the passage opening and closing unit 23 can be detected precisely during both the HC adsorption process and the HC desorption and purification process. Due to the ability to detect failures in the reed value 26, this embodiment can carry out failure diagnosis more precisely than Embodiment 1.

Other relevant items are similar to those in Embodiment 1.

[Embodiment 3]

Figure 13:
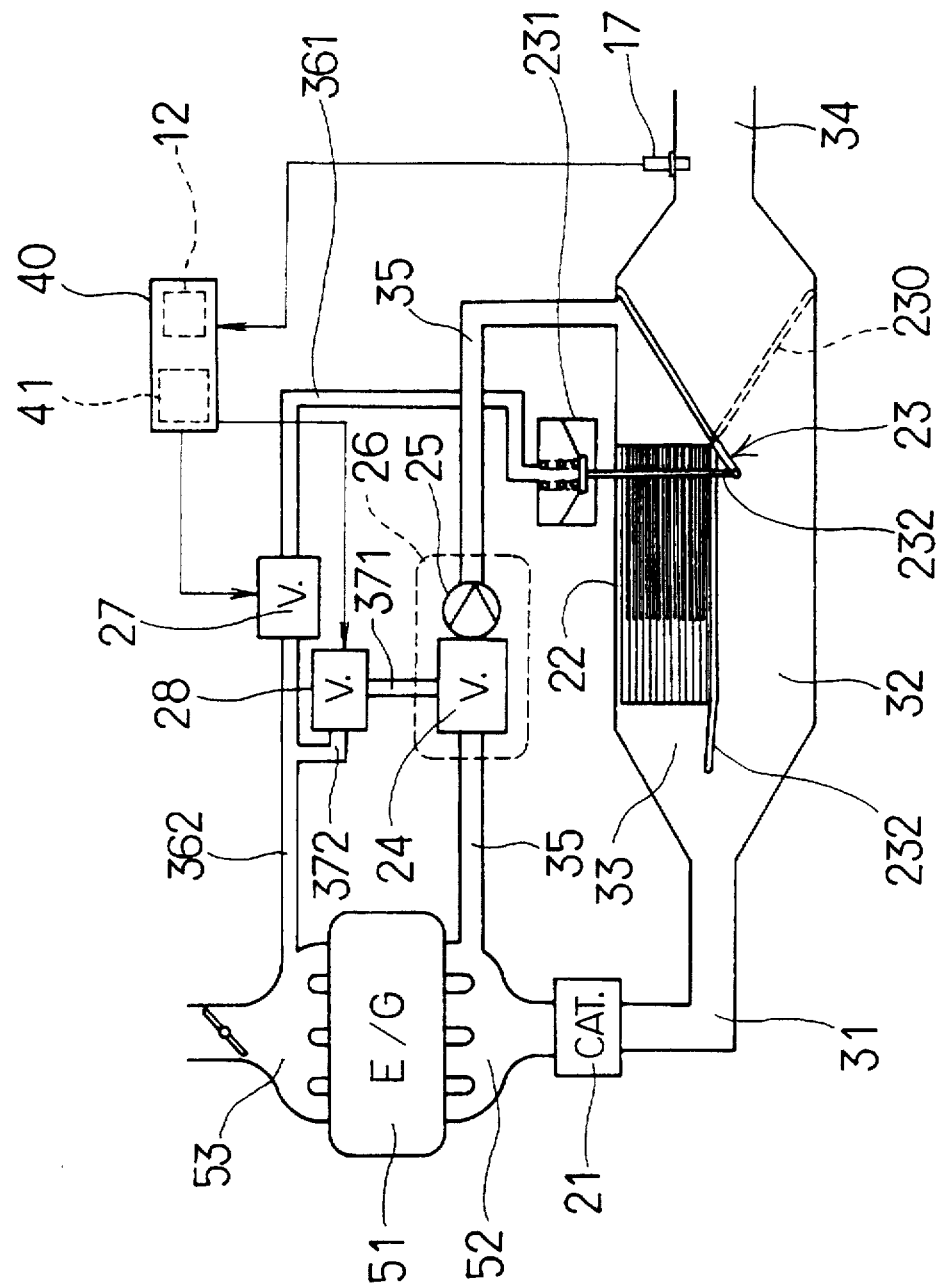
FIG. 13 is a system block diagram of an exhaust gas purifying apparatus according to Embodiment 3.
Figure 14:
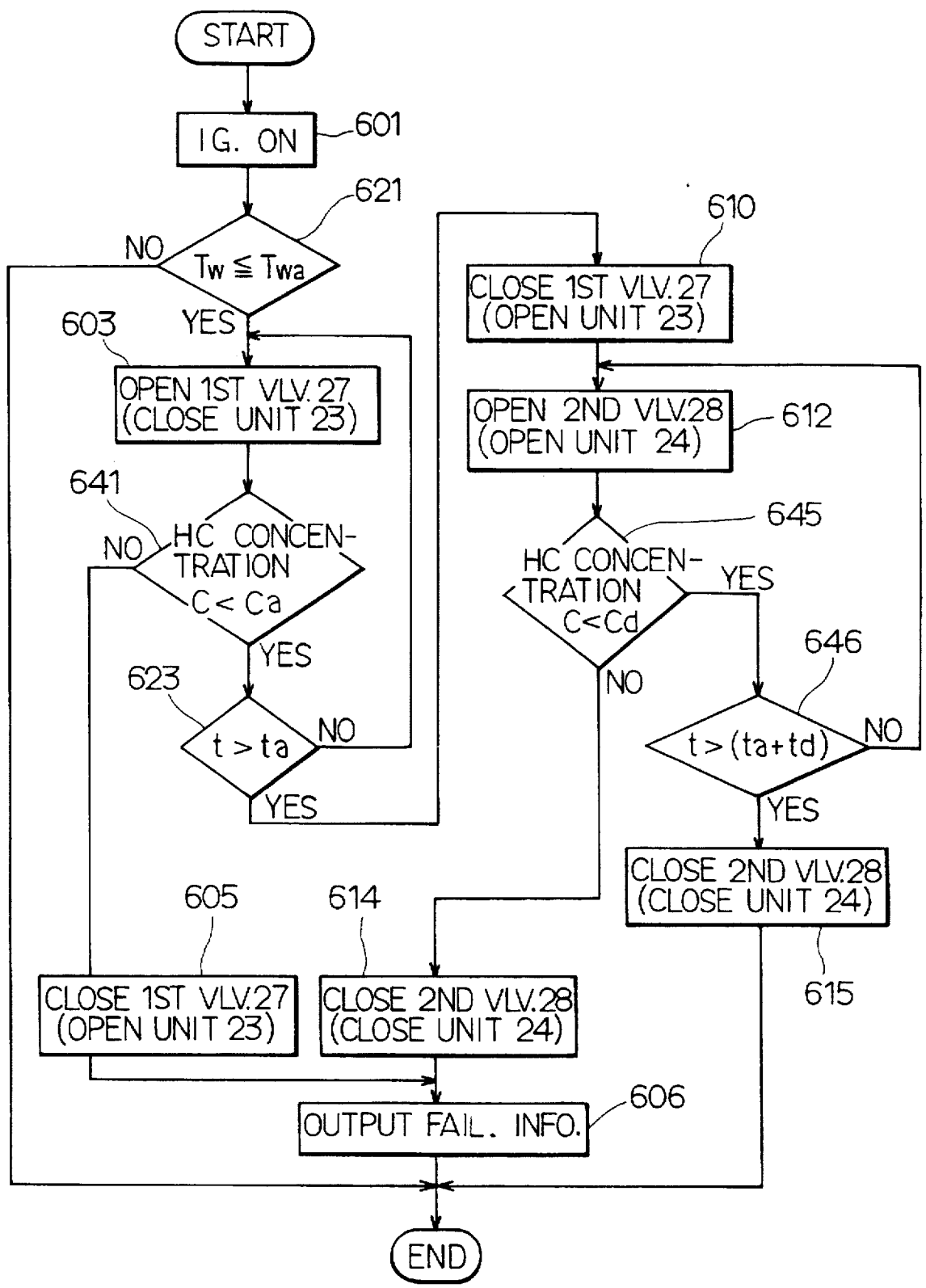
FIG. 14 is a flowchart showing control and failure diagnosis in the exhaust gas purifying apparatus according to Embodiment 3.

This embodiment is similar to Embodiment 1 except that the failure diagnosis device 12 has been replaced according to the third invention, as shown in FIGS. 13 and 14.

That is, the failure diagnosis device 12 according to this embodiment employs, as shown in FIG. 13, an HC sensor 17 to detect the concentration of HC in the discharge passage 34 in order to diagnose failures in the exhaust gas purifying apparatus 1 according to the flowchart for failure diagnosis shown in FIG. 14.

At step 601, the engine 51 is started (=IG ON), the process proceeds to step 621. The controller 41 then receives signals from an engine water temperature sensor and exhaust temperature sensor (not shown) to determine whether the adsorbing device 22 is ready for adsorption.

If, for example, the value of the water temperature sensor $T_w$ (°C.) is equal to the adsorbable temperature $T_{wa}$ (°C.) or less, the process determines that an HC adsorption process should be started, and then proceeds to step 603 to open the first solenoid valve 27. Exhaust gas then starts to flow through the adsorbing device 22, in which cold HC in the exhaust gas is adsorbed.

While the cold HC is being adsorbed at step 641, the HC concentration C of exhaust gas is sensed by the HC sensor 17 and monitored by the failure diagnosis device 12.

Figure 15:
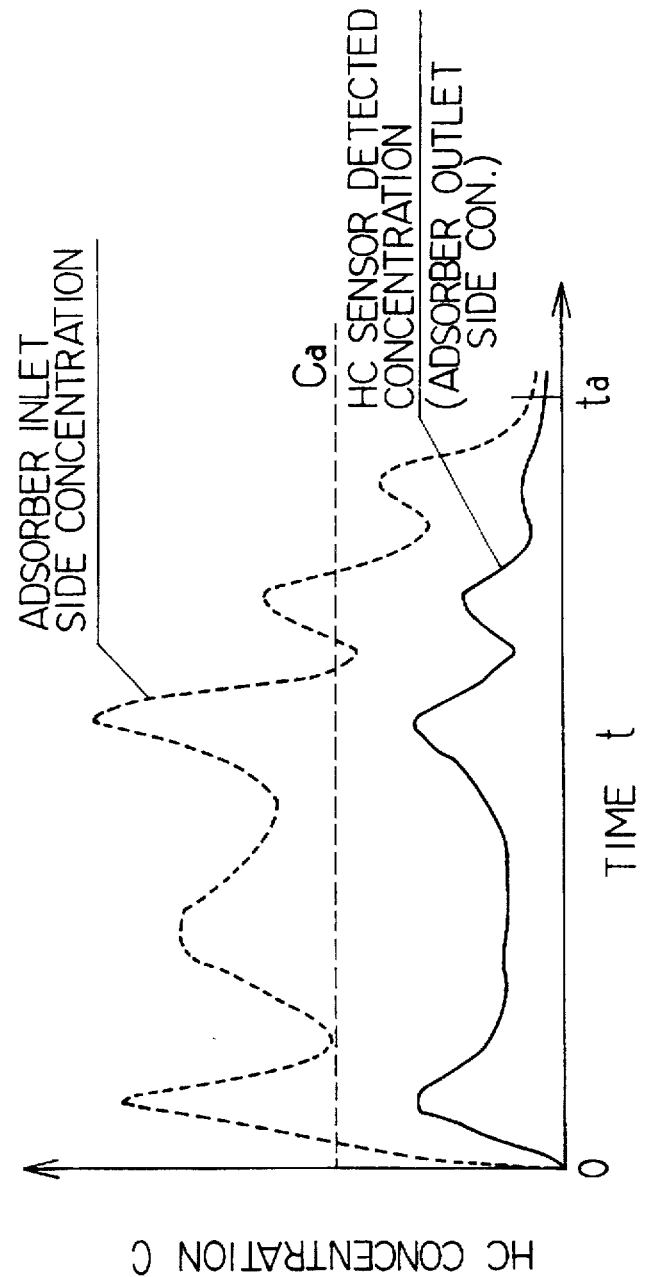
FIG. 15 is a transition graph showing the HC concentration in an adsorption process according to Embodiment 3.

An example of changes in the concentration C is shown in FIG. 15. The HC concentration C starts to decrease due to adsorption by the adsorbing device 22 immediately after the engine 51 has been started. The value of the concentration C of is always less than its allowable value $C_a$ under normal conditions.

If, however, leakage flow from the first passage opening and closing unit 23 increases or if exhaust gas leaks from the opening 224 shown in FIG. 2 due to damage to the adsorbing device 22, the amount of cold HC adsorbed decreases and C becomes equal to its allowable value $C_a$ or more.

Thus, at step 641, the concentration C sensed by the HC sensor 17 is checked to determine whether it is less than the set value $C_a$.

If the HC concentration C is equal to $C_a$ or more, the process proceeds to steps 605, 606 to output information on the failure in the apparatus as in Embodiments 1 and 2.

That is, if a failure occurs in the passage opening and closing unit 23, failure in the apparatus can be detected by monitoring the HC concentration C at step 641, as described above.

At step 641, however, if the concentration of HC has a normal value (C<$C_a$), the process proceeds to step 623 to check the period of time (t) that has passed since the engine was started. If it is within a specified period of time (ta) (t≦ta), the check routine for the HC concentration C is continued after step 603 (step 641). The adsorption of HC should be continued over the specified period of time (ta).

If at step 623, the specified period of time (ta) has passed after the engine was started, the process proceeds to step 610 to close the first solenoid valve 27 in response to a signal from the controller 41, thereby switching the passage opening and closing unit 23 to the position shown by the solid line in FIG. 13.

Exhaust gas thus has its HC purified by the catalyst device 21 already activated due to heat, and then flows through the second main passage 32.

At step 612, the second passage opening and closing unit 24 is opened.

Consequently, the one-way valve 25 is intermittently opened, and HC desorbed from the adsorbing device 22 flows into the exhaust manifold 52, in which the HC is purified by the catalyst device 21 together with the HC in exhaust gas from the engine 51.

At step 645, the HC concentration C during the HC desorption process is checked.

Figure 16:
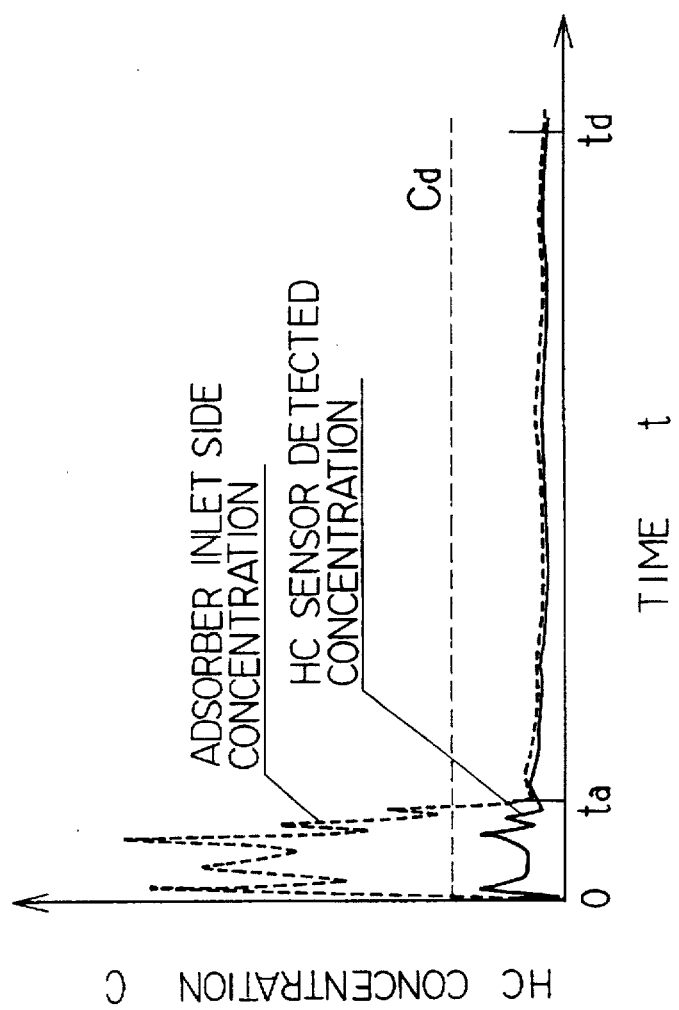
FIG. 16 is a transition graph showing the HC concentration in a desorption process according to Embodiment 3.

The HC concentration C during an HC desorption process has a very small value under normal conditions, as shown in FIG. 16.

Thus, if the HC concentration C is equal to the set value $C_d$ or more, the apparatus is in abnormal conditions, and the process proceeds to steps 614, 606 to close the second passage opening and closing unit 24, thereby initiating the regular state and outputting information on the failure in the apparatus. The set value $C_d$ is smaller than the set value $C_a$.

The HC concentration C becomes equal to the set value $C_d$ or more because of an increase in leakage flow $Q_d$ from the passage opening and closing unit 23, leakage of exhaust from the opening 224 (FIG. 2) which is caused by damage to the adsorbing device 22, or leakage of HC from the upstream side of the adsorbing device 22 to the second main passage 32 which is caused by the blockage of the return passage 35.

As described above, the failure diagnosis device 12 according to this embodiment can detect failures in the apparatus such as failures in the passage opening and closing unit 23 or adsorbing device 22 or the blockage of the return passage 35.

If, however, the HC concentration C remains normal at step 645 and if the period of time specified for a desorption process (ta+td) has passed at step 646, the process proceeds to step 615 to finish the failure diagnosis routine without closing the passage opening and closing unit 24 or outputting failure information as in the regular operation (no failures).

Since this embodiment directly measures the HC concentration behind the adsorbing device 22, it can carry out failure diagnosis more accurately than Embodiment 1 by precisely detecting the leakage of HC during both the adsorption process and the desorption and purification process.

Other relevant items are similar to those in Embodiment 1.

[Embodiment 4]

Figure 17:
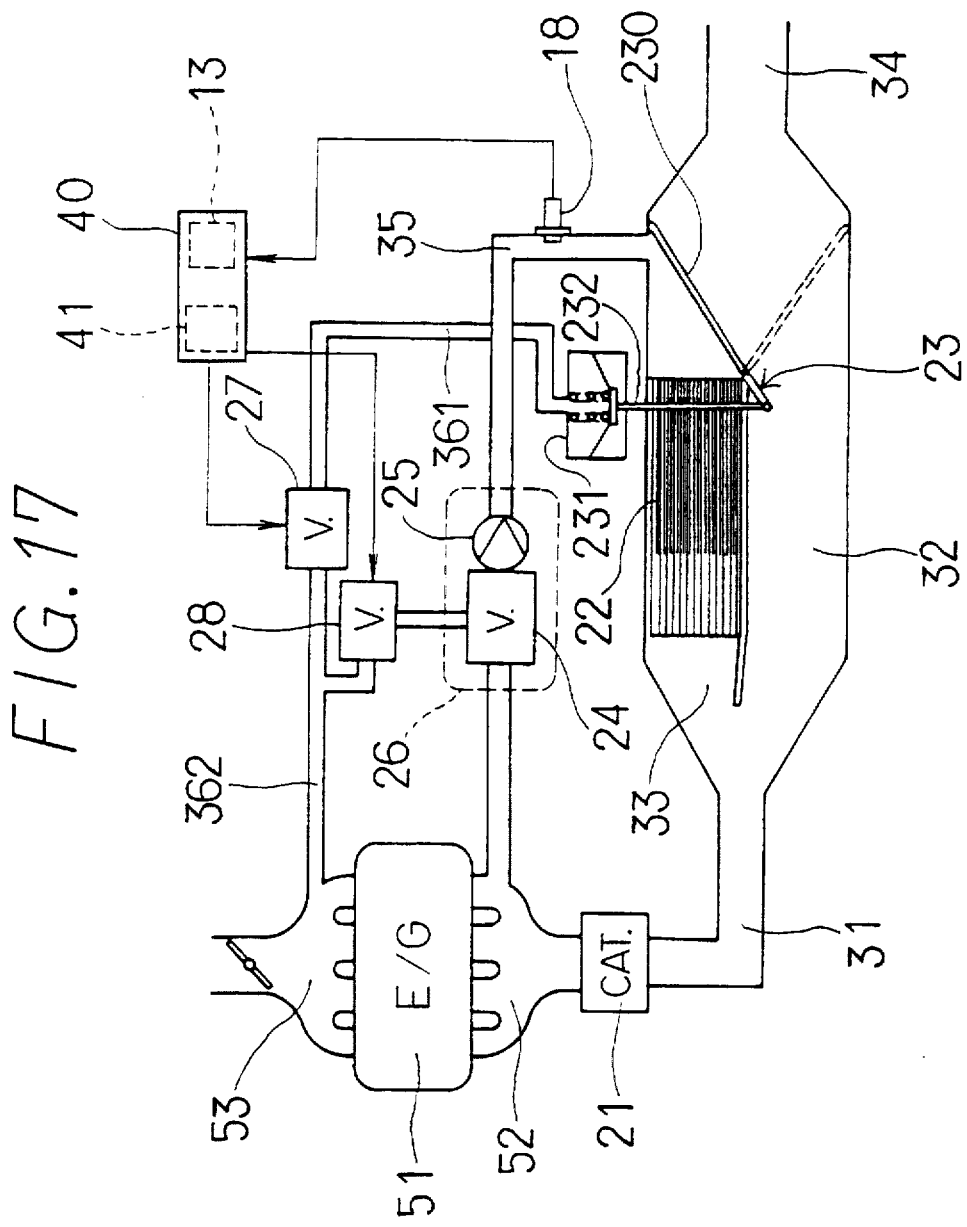
FIG. 17 is a system block diagram of an exhaust gas purifying apparatus according to Embodiment 4.
Figure 18:
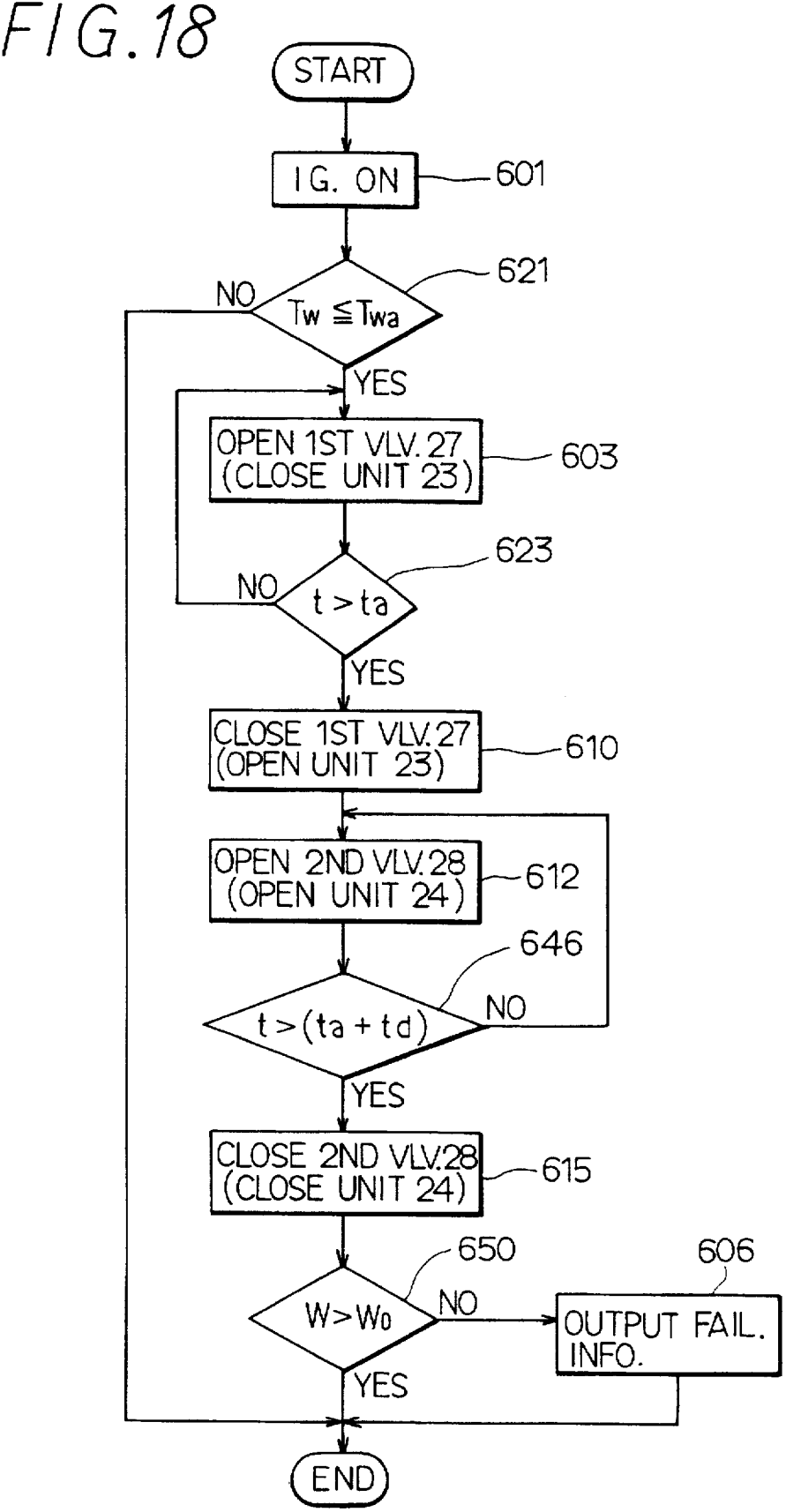
FIG. 18 is a flowchart showing control and failure diagnosis in the exhaust gas purifying apparatus according to Embodiment 4.

This embodiment is similar to Embodiment 1 except that the failure diagnosis device 13 has been replaced according to the fourth invention, as shown in FIGS. 17 and 18.

That is, the failure diagnosis device 13 according to this embodiment has, as shown in FIG. 17 an HC sensor 18 for detecting the HC concentration in the return passage 35 to self-diagnose failures in the exhaust gas purifying apparatus 1 according to the failure diagnosis flow shown in FIG. 18.

Although the HC sensor 18 is located near the adsorbing device 22 in the return passage 35 in FIG. 17, it may be disposed near the engine 51 in the return passage 35.

At step 601, the engine 51 is started. The controller 41 then receives signals from an engine water temperature sensor and exhaust temperature sensor (not shown) to determine whether the adsorbing device 22 is ready for adsorption.

That is, if the value $T_w$ (°C.) is equal to the adsorbable temperature $T_{wa}$ (°C.) or less at step 621, the first solenoid valve is opened at step 603 to cause exhaust gas to flow through the adsorbing device 22, in which the cold HC in the exhaust gas is adsorbed.

At the subsequent step 623, if the specified period of time (ta) has passed after the engine was started, the first solenoid valve 27 is closed in response to a signal from the controller 41 at step 610, thereby switching the passage opening and closing unit 23 to the position shown by the solid line in FIG. 17.

Exhaust gas thus has its HC purified by the catalyst device 21 already activated due to heat, and then flows through the second main passage 32.

As described above, after the engine 51 has warmed up and the first solenoid valve 27 has been closed, the controller 41 opens the solenoid valve 28 at step 612.

As in Embodiment 1, the passage opening and closing unit 24 is opened, and the one-way valve 25 is intermittently opened, thereby causing HC desorbed from the adsorbing device 22 to flow into the exhaust manifold 52, in which the HC is purified by the catalyst device 21 together with the HC in exhaust gas from the engine 51.

After the period of time required to completely desorb and purify HC has been passed [t>(ta+tb)] at step 646, the second solenoid valve 28 is closed in response to a signal from the controller 41 at step 615, thus closing the passage opening and closing unit 24 to finish the sequence of purification steps.

While HC is being desorbed and purified, exhaust gas that is to be refluxed is flowing through the return passage 35 including the HC sensor 18. The HC is then desorbed from the adsorbing device 22.

Figure 19:
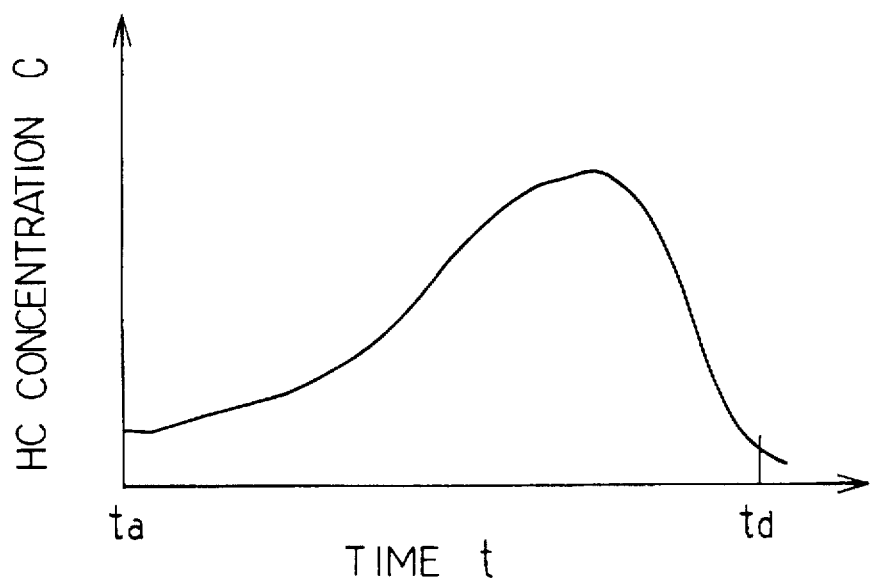
FIG. 19 is a transition graph showing the HC concentration in a desorption process according to Embodiment 4.

The HC concentration C initially increases with increasing temperature of the adsorbing device 22 as the time passes by, as shown in FIG. 19. Once all the adsorbed HC has been desorbed, the value of the concentration C becomes very small as in HC flowing through the second main passage 32.

Figure 20:
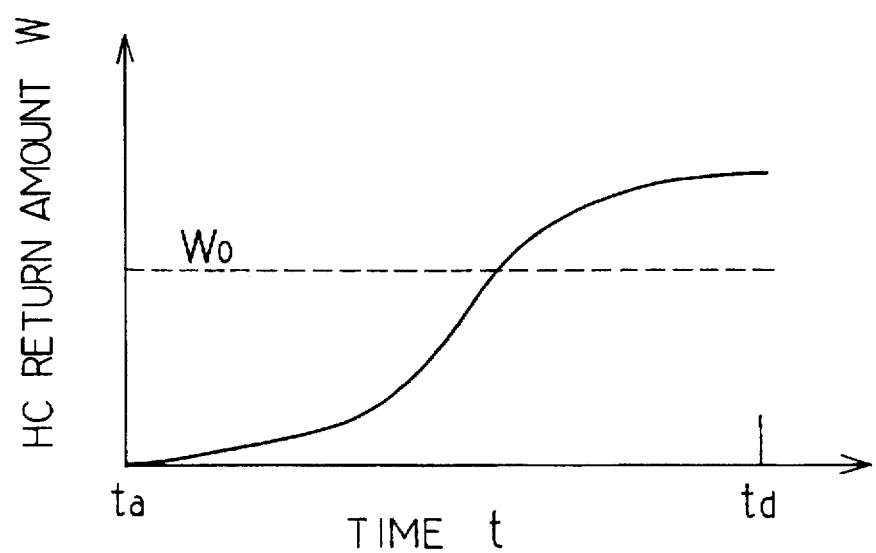
FIG. 20 is a transition graph for the accumulated value of the reflux HC amount in the desorption process according to Embodiment 4.

If the apparatus is in normal conditions, the HC concentration C multiplied by the return flow $Q_r$, then subjected to integration over time, that is, the total amount of refluxed HC W is equal to an allowable value $W_0$ or more while the HC is being desorbed and purified [ta<t<(ta+td)] (FIG. 20).

The failure diagnosis device 13 has set therein a mathematic operation program capable of calculating from the operation state of the engine 51 the reflux flow $Q_r$ through the return passage 35 (a flow calculation unit). An accumulation unit calculates the total amount of HC W from $Q_r$ and C.

If leakage flow from the passage opening and closing unit 23 increases or if exhaust gas leaks from the opening 224 in FIG. 2 due to damage to the adsorbing device 22, the amount of HC refluxed decreases and W fails to exceed $W_0$.

This also occurs when a failure occurs in the reed valve 26 to prevent HC from being refluxed, resulting in a decrease in the amount of HC.

Thus, if the actuator 231, shaft 232, blade 230, adsorbing device 22, or reed valve 26 is damaged, the failure in the device can be diagnosed by monitoring the HC concentration C refluxed at step 650, as described above.

If the amount of HC refluxed is equal to $W_0$ or less at step 650, the process proceeds to step 606 to output failure information.

Other relevant items are similar to those in Embodiment 1.

[Embodiment 5]

Figure 21:
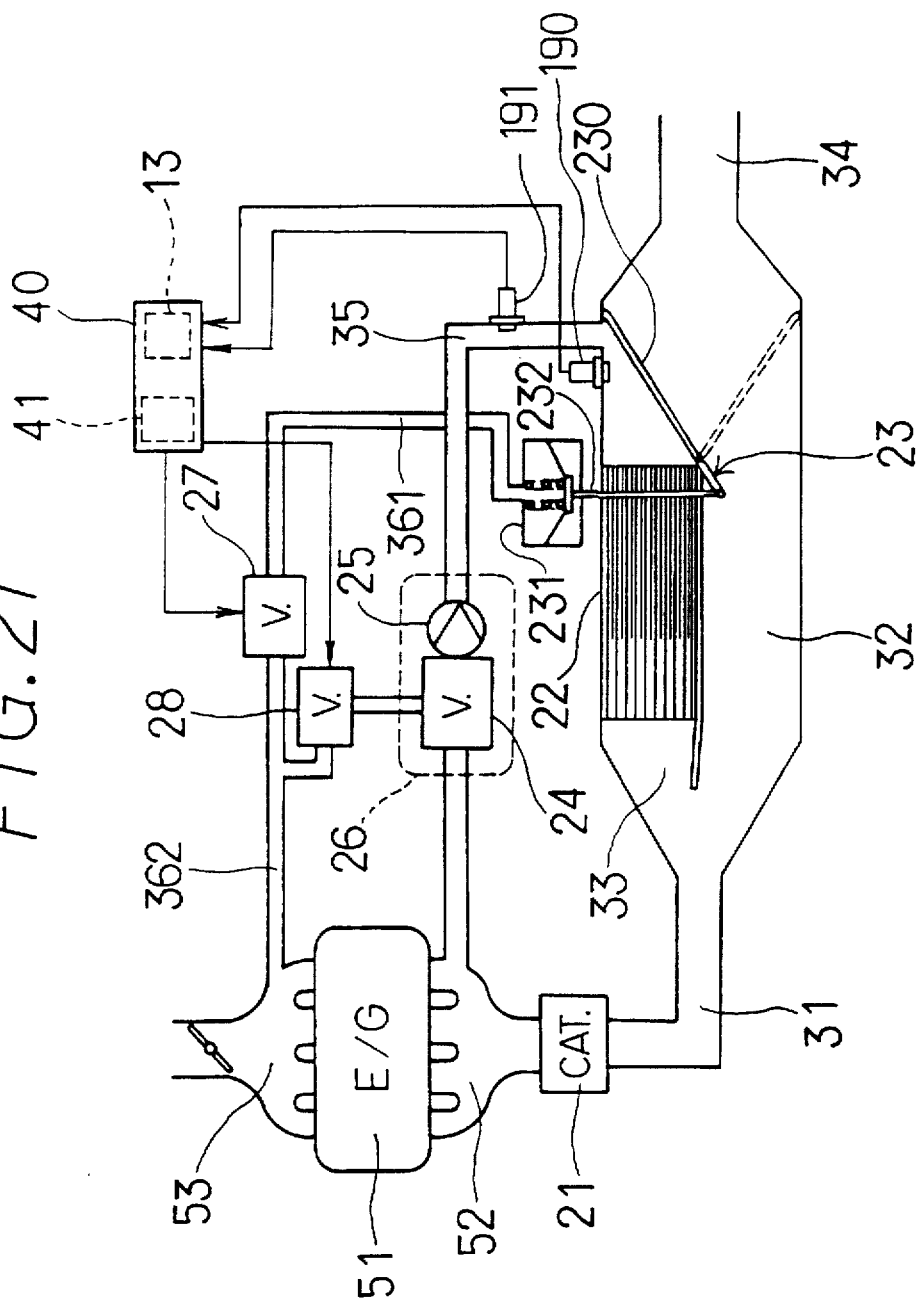
FIG. 21 is a system block diagram of an exhaust gas purifying apparatus according to Embodiment 5.
Figure 22:
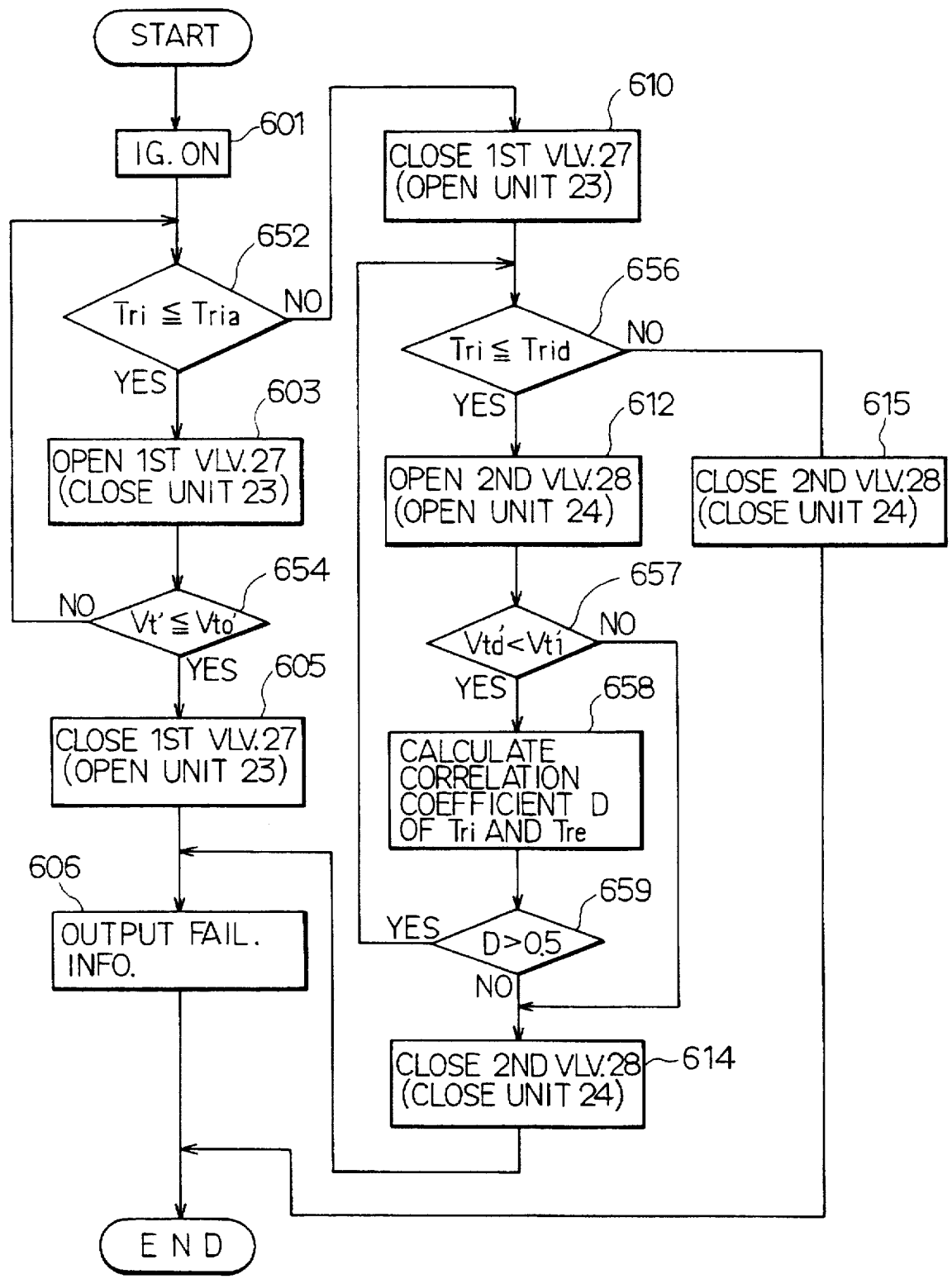
FIG. 22 is a flow chart showing and failure diagnosis in the exhaust gas purifying apparatus according to Embodiment 5.

This fifth embodiment is another embodiment that changes the failure diagnosis device 10 to modified failure diagnosis device 14 as shown in FIGS. 21 and 22.

That is, as shown in FIG. 21, the failure diagnosis device 14 according to this embodiment has temperature sensors 190 and 191 in the downstream of adsorbing device 22 and in return passage 35 respectively. Thereby, Exhaust gas temperature $T_{ri}$ at the adsorbing device 22 and $T_{re}$ at return passage 35 are respectively measured.

Figure 23:
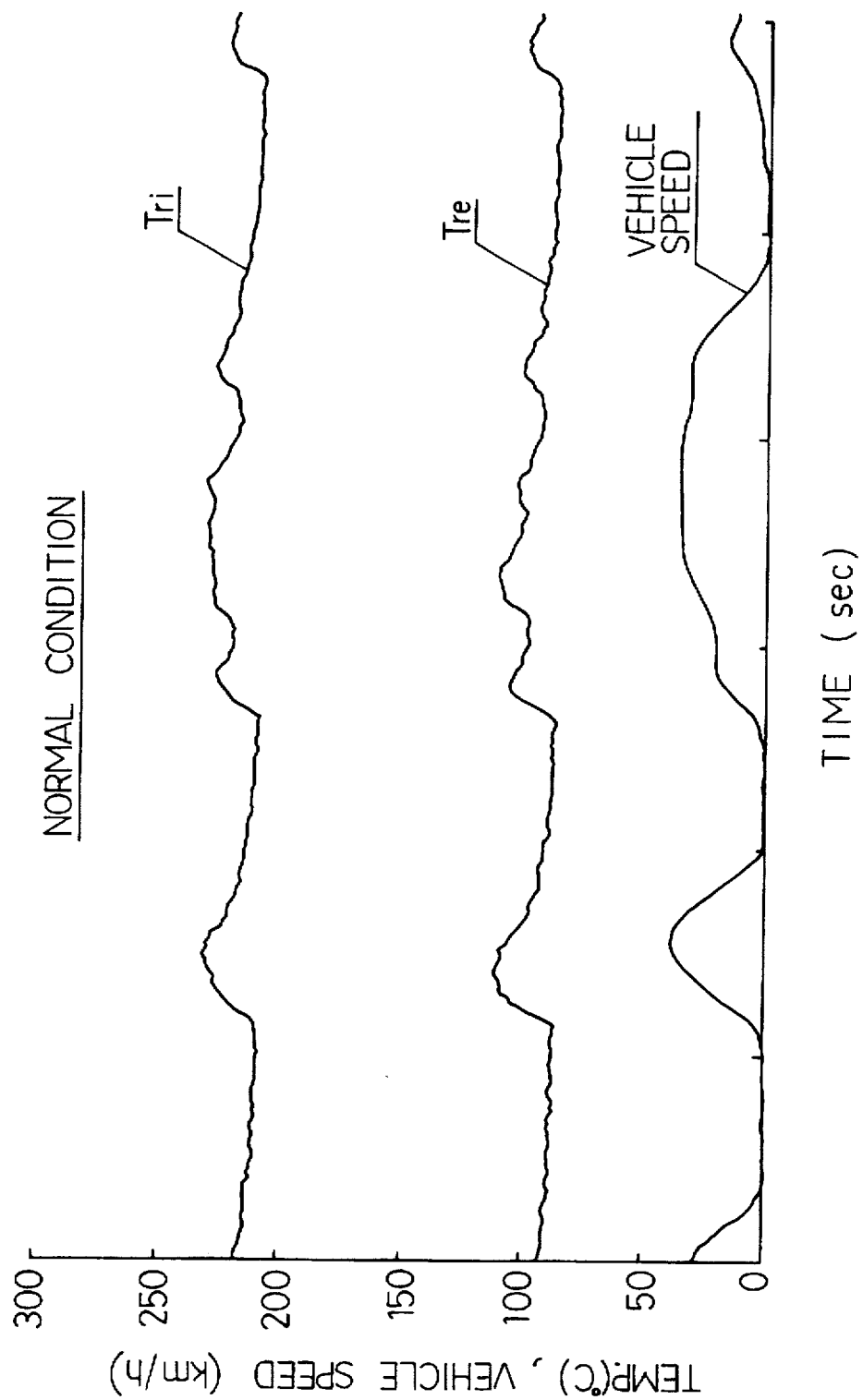
FIG. 23 is a transition graph showing the relation between the exhaust gas temperature $T_{ri}$ at the downstream of the adsorbing device and the exhaust gas temperature $T_{re}$ in the return passage in normal condition.
Figure 24:
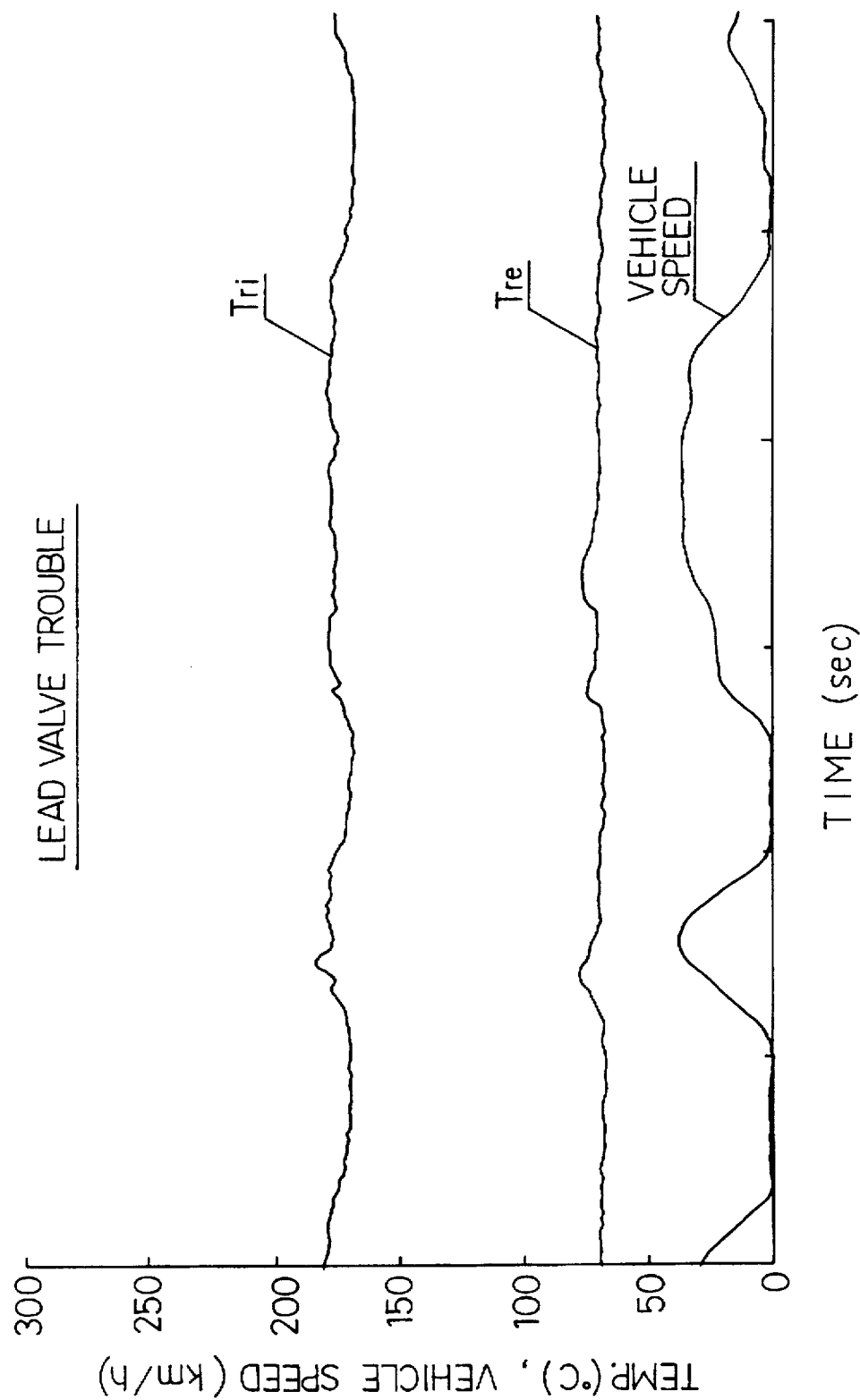
FIG. 24 is a transition graph showing the relation between the exhaust gas temperature $T_{ri}$ at the downstream of the adsorbing device and the exhaust gas temperature $T_{re}$ in the return passage in failure condition (lead valve failure)
Figure 25:
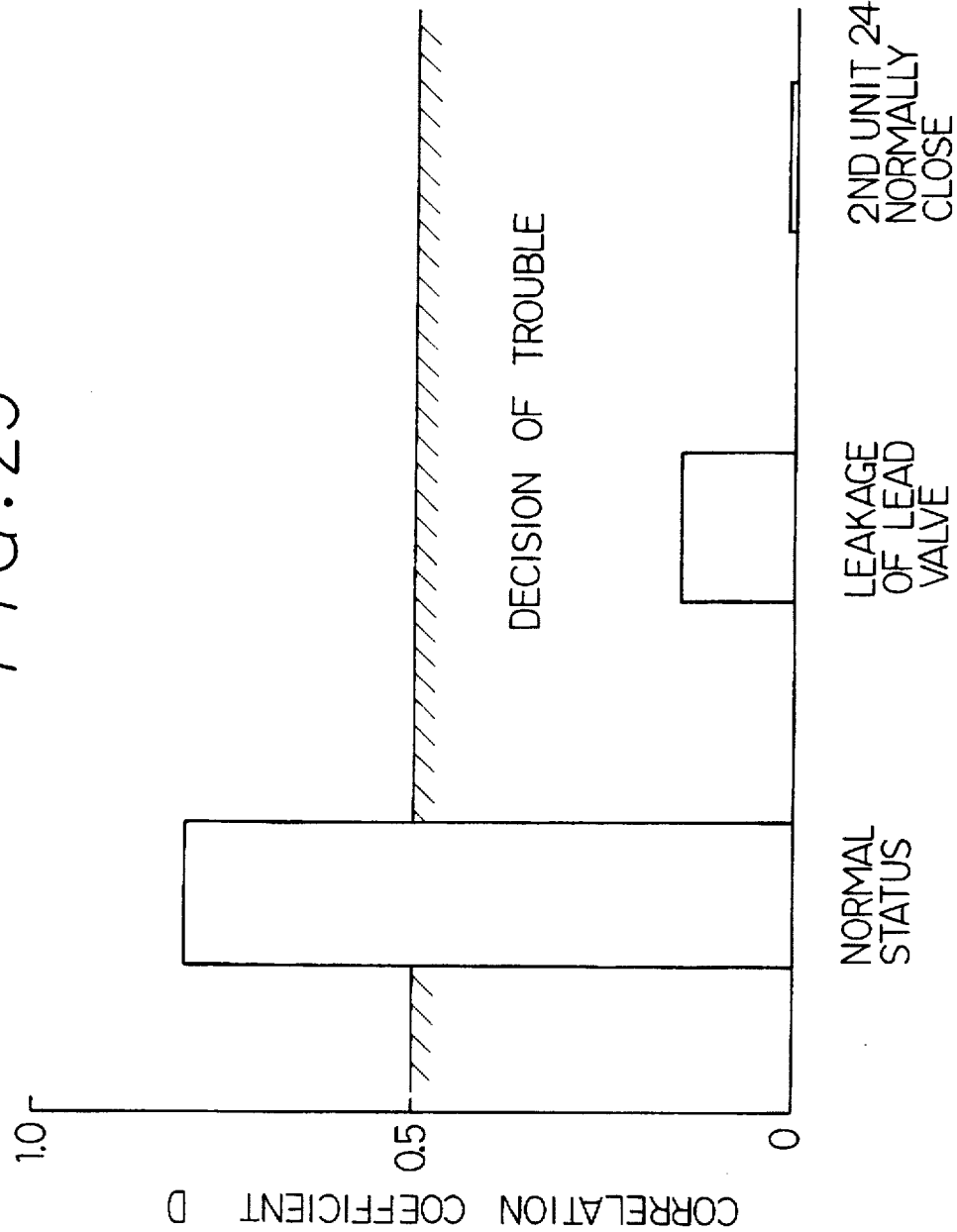
FIG. 25 is a graph showing the correlation coefficient between $T_{ri}$ and $T_{re}$ in three different modes.

The exhaust gas temperature $T_{ri}$ at the adsorbing device 22 and $T_{re}$ at return passage 35 has a strong correlation in normal operation condition of the one-way valve 25, the lead valve 26 and the opening and closing unit 24 for the one-way valve 25 as shown in FIG. 23. On the contrary, in case a failure arises, for example, at lead valve 26, the correlation between the exhaust gas temperatures $T_{ri}$ and $T_{re}$ is broken as shown in FIG. 24. For example, in case the one-way valve is failed and reflux is caused, and the opening and closing unit 24 in the return passage 35 is failed to be in normally closes condition, the correlation coefficient D between the exhaust gas temperatures $T_{ri}$ and $T_{re}$ are declined greatly as shown in FIG. 25. Therefore, the failure in the apparatus is determined based on the correlation calculated by the correlation calculating unit.

Failures in the exhaust gas purifying apparatus 1 is diagnosed according to the flowchart in FIG. 22.

First, at step 601, the engine 51 is started (IG. ON). Step proceed to step 652. At step 652, the controller 41 receives signals of $T_{ri}$ from the temperature sensor 190 and checks and determines whether the adsorbing device is ready to adsorb. At step 652, when the value $T_{ri}$ of the exhaust gas temperature is equal to a value $T_{ria}$ which is a temperature for the adsorbing device to enable to adsorb or less, the process proceed to step 603.

At step 603, the first solenoid valve 27 is opened and the passage opening and closing unit 23 is switched to the dotted line position in FIG. 21. Exhaust gas flows through the adsorbing device 22 and the cold HC in the exhaust gas is adsorbed.

During the cold HC is adsorbed, at step 654 the exhaust gas leakage flow $Q_a$ from the passage opening and closing unit 23 is determined whether of which leakage amount is large or small. This determination of the leakage flow $Q_a$ is determined in response to the temperature rising speed as similar to step 604 in Embodiment 1. In Embodiment 1, the temperature rising speed $V_t$ of the adsorbing device is adopted to determine, however, in this embodiment the temperature rising speed $V_t'$ which is a temperature rising speed of exhaust gas flowing downstream of the adsorbing device is adopted to determine. The temperature rising speed $V_t'$ is measured a specified time of period (4–5 seconds) later than closing of the unit 23 at step 603 and determined. Consequently, when the temperature rising speed $V_t'$ is smaller than an allowable value $V_{t0}'$, the unit 23, i.e., the exhaust gas purifying apparatus 1 is determined to be failed and then the first solenoid valve 27 is closed at step 605. And further, at step 606, the failure information is output.

The other hand, at step 652, when the value $T_{ri}$ is higher than the value $T_{ria}$ after the warming up of the engine 51, step proceed to step 610. At step 610, the first solenoid valve 27 is closed and the first passage opening and closing unit 23 is then placed into the position shown by the solid line (in which the passage opening and closing unit 23 is opened). The passage for exhaust gas is then switched, and the exhaust gas starts to flow through the second main passage 32 that does not have an adsorbing device 22.

From steps 656 through 659, the following operation is performed until the temperature $T_{ri}$ of the adsorbing device 22 exceeds a desorption finish temperature $T_{rid}$.

That is, the process starts reading a value from the temperature sensor 190 to monitor the temperature $T_{ri}$ of the adsorbing device 22 immediately after the first solenoid valve 27 has been closed. At step 656, if the temperature $T_{ri}$ is equal to $T_{rid}$ or less, the process proceeds to step 612 to open the second solenoid valve 28.

As similar to Embodiment 1, since the passage opening and closing unit 24 is open, exhaust pulses generated within the exhaust manifold 52 are transmitted via the return passage 35 to the one-way valve 25, which is intermittently opened. This causes HC desorbed from the adsorbent of the adsorbent carrying layer 220 of the adsorbing device 22 to flow into the exhaust manifold 52 through the return passage 35. The HC is then purified by the catalyst device 21 together with the HC in exhaust gas from the engine 51.

At continuous step 657, an amount of the leakage flow $Q_d$ from the passage opening and closing unit 23 is determined. This determination also uses a temperature rising speed $V_{td}'$ which is an exhaust gas temperature at the downstream of the adsorbing device 22 as similar to embodiment 1. If the temperature rising speed $V_{td}'$ is larger than an allowable value $V_{t1}'$, it can be determined that the passage opening and closing unit 23 (the apparatus 1) is failed and the second solenoid valve 28 is closed to initiate the regular state at step 614, and failure information about the apparatus is output at step 606.

On the contrary, at step 657, if the temperature rising speed $V_{td}'$ is equal to an allowable value $V_{t1}'$ or less, the passage opening and closing unit 23 is determined to be normal, it proceeds to step 658. At step 658, the temperature sensors 190 and 191 measure respectively the temperature $T_{re}$ of exhaust gas flowing in return passage 35 and the temperature $T_{ri}$ simultaneously.

The micro-computer 40 stores a program calculating correlation coefficient D between the temperatures $T_{re}$ and $T_{ri}$. Namely, correlation coefficient D is calculated based on the following equation by collecting n objects of the temperatures $T_{re}$ and $T_{ri}$ every sampling time TB and calculating the mean value of them, the standard deviation K and the covariance Co;

$$D = Co(T_{ri}, T_{re})/\{K(T_{ri}) \times K(T_{re})\}$$

herein, $$Co(T_{ri}, T_{re}) = [\Sigma\{T_{ri}(i) - T_{ri}(av)\} \times \{T_{re}(i) - T_{re}(av)\}]/n$$

$$K(T_{ri}) = [[\Sigma\{T_{ri}(i) - T_{ri}(av)\}^2]/n] \times 0.5$$

$$K(T_{re}) = [[\Sigma\{T_{re}(i) - T_{re}(av)\}^2]/n] \times 0.5$$

herein, $T_{ri}(i)$=ith data of $T_{ri}$ $T_{re}(i)$=ith data of $T_{re}$ $T_{ri}(av)$=the mean value of n objects of $T_{ri}$ $T_{re}(av)$=the mean value of n objects of $T_{re}$ More concreately, the sampling time Ts is 0.5 sec and n is 100.

If the one-way valve 25 fails, the second passage opening and closing unit 24 fails to open or exhaust gas counterflows by deterioration of sealing performance of lead valve 26, the reflux flow $Q_r$ for the return exhaust gas is decreased (FIG. 4).

When the second passage opening and closing unit 24 disables opening, the reflux flow $Q_r$ becomes zero. Thereby, even if the temperature $T_{ri}$ corresponding to an inlet temperature of the reflux exhaust gas is affected by the temperature of the exhaust gas flowing in the second main passage 32 and is fluctuated, the temperature $T_{re}$ in the middle of the return passage 35 does not fluctuate (or fluctuates a little bit) due to no exhaust gas flow in the return passage 35. Therefore, A correlation between the temperatures $T_{ri}$ and $T_{re}$ becomes very small and the correlation coefficient D does not exceed the set value.

Therefore, as shown in step 659, a failure of the second passage opening and closing unit 24 is determined due to the value of the correlation coefficient. When it is determined to fail, it is proceeded to step 614 and the second solenoid valve 28 is closed and failure information is output at step 606.

When the reflux of the exhaust gas is caused by the deterioration of sealing performance of the one-way valve, the reflux flow $Q_r$ is decreased. Exhaust gas counterflows to the adsorbing device 22 through the exhaust manifold 52 and the return passage 35. Therefore, the temperature $T_{re}$ corresponding to a temperature in the middle of the reflux passage 35 is affected by not only the temperature fluctuation at the inlet portion for reflux exhaust gas but the reflux exhaust gas. Since the temperature fluctuation of the reflux exhaust gas does not synchronized with the temperature fluctuation of the exhaust gas flowing in the second main passage 32, of exhaust gas flowing in the second main passage 32, the temperature $T_{re}$ in the middle of the return passage 35 becomes small correlation with the temperature $T_{ri}$ and the correlation coefficient D does not exceed the set value.

Therefore, at step 659, the failure of the lead valve 26 is determined by a value of correlation coefficient. In case the failure is determined, the second solenoid valve 28 is closed at step 614 and the failure information is output at step 606.

The passage opening and closing unit 23 is switched to a open position shown in the solid line in the figure and HC desorbing process is started. In case steps 612–659 are proceeded normally, the temperature reaches the temperature $T_{rid}$ completing a desorption and purification at step 656 and it proceeds to step 615. And then the second solenoid valve 28 and the passage opening and closing unit 24 are closed and normal operation is started.

Like the above, according to this embodiment, an exhaust gas purifying apparatus 1 having self diagnosis function to achieve excellent exhaust gas purification character can be provided.

[Embodiment 6]

An exhaust gas purifying apparatus according to an embodiment of this invention is described with reference to FIGS. 26 to 32.

This embodiment is an exhaust gas purifying apparatus 1 for an engine comprising a catalyst device 11 disposed in a first main passage 31 on the upstream side of an discharge passage 30 of an engine 51 for controlling the emission of an exhaust gas; an adsorbing device 22 disposed on the downstream side of the first main passage 31 for adsorbing the toxic components of the exhaust gas; a return passage 35 for connecting the downstream side of the adsorbing device 22 to the first main passage 31; a second main passage 32 for allowing the downstream side of the first main passage 31 to directly communicate with an exhaust port without passing through the absorbing device 22; an adsorbing passage 33 for allowing the downstream side of the catalyst device 11 to communicate with the exhaust port via the adsorbing device 22; and a switching unit for causing the adsorbing passage 33 to pass the exhaust gas through if the temperature of the exhaust gas is a specified value or lower and causing the second main passage 32 to pass the exhaust gas through and to open the return passage 35 if the temperature of the exhaust gas exceeds the specified value.

The return passage 35 and the exhaust passage on the upstream side of the adsorbing device 22 each include an oxygen concentration sensor 121, 122 for detecting $O_2$ that is the gas component of an exhaust gas which varies according to the operation of the adsorbing device 22.

This embodiment also has a time measuring means 41 for receiving signals output by the oxygen concentration sensors 121, 122 and measuring the period of time te from immediately after the opening of the return passage 35 until the outputs from the oxygen concentration sensors match, and a failure determination unit 42 for determining that the apparatus is failed if the measured period of time te is outside a specified range.

Each component is described below.

Figure 26:
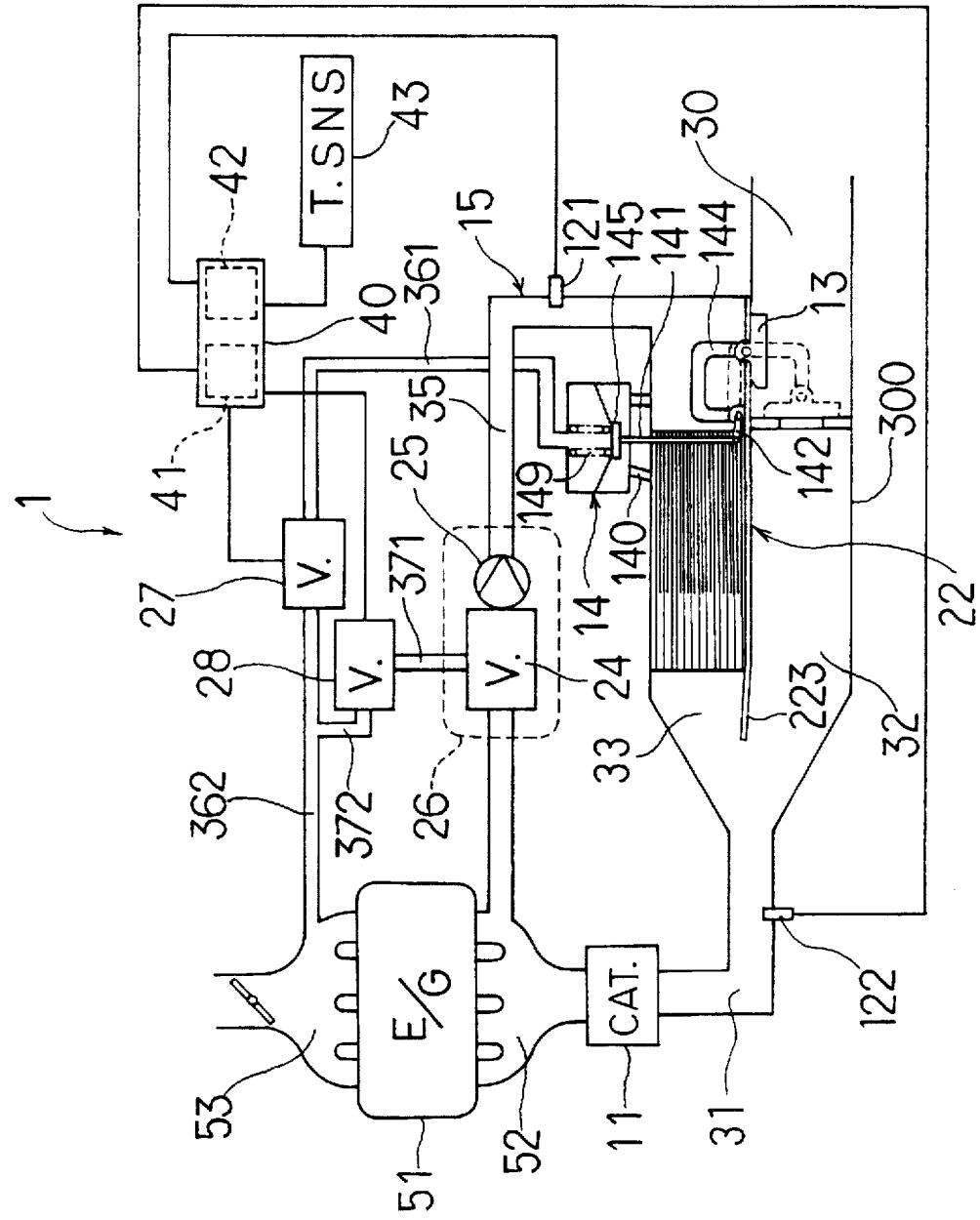
FIG. 26 is a system block diagram of an exhaust gas purifying apparatus according to Embodiment 6.

As shown in FIG. 26, a catalyst device 11 is disposed immediately after an exhaust manifold 52 in an first main passage 31 of an engine 51. A large diameter portion 300 is disposed on the downstream side of the catalyst device 11 in the first main passage 31, and a adsorbing passage 33 in which the adsorbing device 12 is housed and a second main passage 32 are formed in the large diameter portion 300.

The adsorbing device 22 comprises stainless steel or ceramic such as cordierite, and has a semi-cylindrical shape fitting the shape of the large diameter portion 300. The adsorbing device 22 has a large number of parallel through holes 221, and an adsorbent carrying layer 220 located in the rear of the adsorbing device carries a zeolite adsorbent, as shown in FIG. 2, while a non-adsorbent-carrying layer 229 located in the front of the adsorbing device does not carry an adsorbent.

The adsorbing device 22 may be elliptic or square depending upon the shape of the large diameter portion 300.

A first opening and closing unit 13 constituting a switching unit is disposed immediately after the rear end of the adsorbing device 22, as shown in FIG. 26.

The distance between the catalyst device 11 and the adsorbing device 22 is set so that the period of time spent by the catalyst device 11 before reaching the activation temperature when heated by an exhaust gas matches the period of time spent by the adsorbent carried by the adsorbing device 22 before losing its adsorbing function when heated.

The adsorbing device 22 is separated from the second main passage 32 by a partition wall 223, and also retained by the partition wall 223. An opening 224 is formed in the partition wall 223, as shown in FIG. 2.

In addition, a straightening vane 225 is disposed on the upstream side of the adsorbing device 22 to uniform the flow distribution of an exhaust gas flowing through the adsorbing device 22 in order to improve the adsorption efficiency.

The partition wall 223 and the straightening vane 225 may be integrated as shown in FIG. 2 or separated from each other.

A return passage 35 branches from the rear of the passage 32, and has a lead valve 26 in which a one-way valve 25 for restraining the flow of exhaust within the pipe to one direction and a second opening and closing unit 24 constituting a switching unit are integrated. The return passage 35 is in communication with the exhaust manifold 52.

The first oxygen concentration sensor 121 is installed on the upstream side of the lead valve 26 in the return passage 35.

An operating member 14 for operating the first opening and closing unit is provided on a pedestal 140 in the rear of the adsorbing device 22. The first opening and closing unit 13 is connected to a movable piece 145 of the operating member 14 via a shaft 141, crank 142, and a pivot shaft, and an arm 144.

Since the operating member 14 is separated from the adsorbing member 22 by the pedestal 140, the heat of an exhaust gas is not directly projected on the operating member 14. Only a small amount of heat is transferred to the operating member 14 via the shaft 141 or pedestal 140, and a failure is unlikely to occur therein because it tends to be cooled by the atmosphere.

The operating member 14 is in communication with a surge tank 53 in the upstream portion of the engine 51 via inlet pipes 361, 362 to obtain a negative pressure from the tank for activation. A first solenoid valve 27 is disposed in the boundary between the inlet pipes 361 and 362.

The one-way valve 25 in the return passage 35 allows only the passage of an exhaust gas flowing from the downstream side of the adsorbing device 22 to the upstream side of the catalyst device 11.

The second opening and closing unit 24 is operated by a diaphragm that responds to a negative pressure. The second opening and closing unit 24 communicates via inlet pipes 371, 372 with the inlet pipe 362 leading to the surge tank 53 in order to supply a negative pressure to the diaphragm. A second solenoid valve 28 is installed between the inlet pipes 371 and 372.

The outputs from the oxygen concentration sensors 121, 122 correspond to the air/fuel ratio of an exhaust gas, and increase rapidly in the rich area (in which the air/fuel ratio is small).

A temperature sensor 43 for detecting the temperature of an exhaust gas is installed and sends output signals to an electronic control unit (ECU) 40 for operating the switching unit.

The time measuring unit 41 and the failure determination unit 42 are formed in the electronic control unit (ECU) 40 with a built-in microcomputer. The ECU receives signals from the oxygen concentration sensors 121, 122 and the temperature sensor 43 to operate the first and second solenoid valves 27, 28 and to control the first and second opening and closing unit 13, 24.

Figure 28:
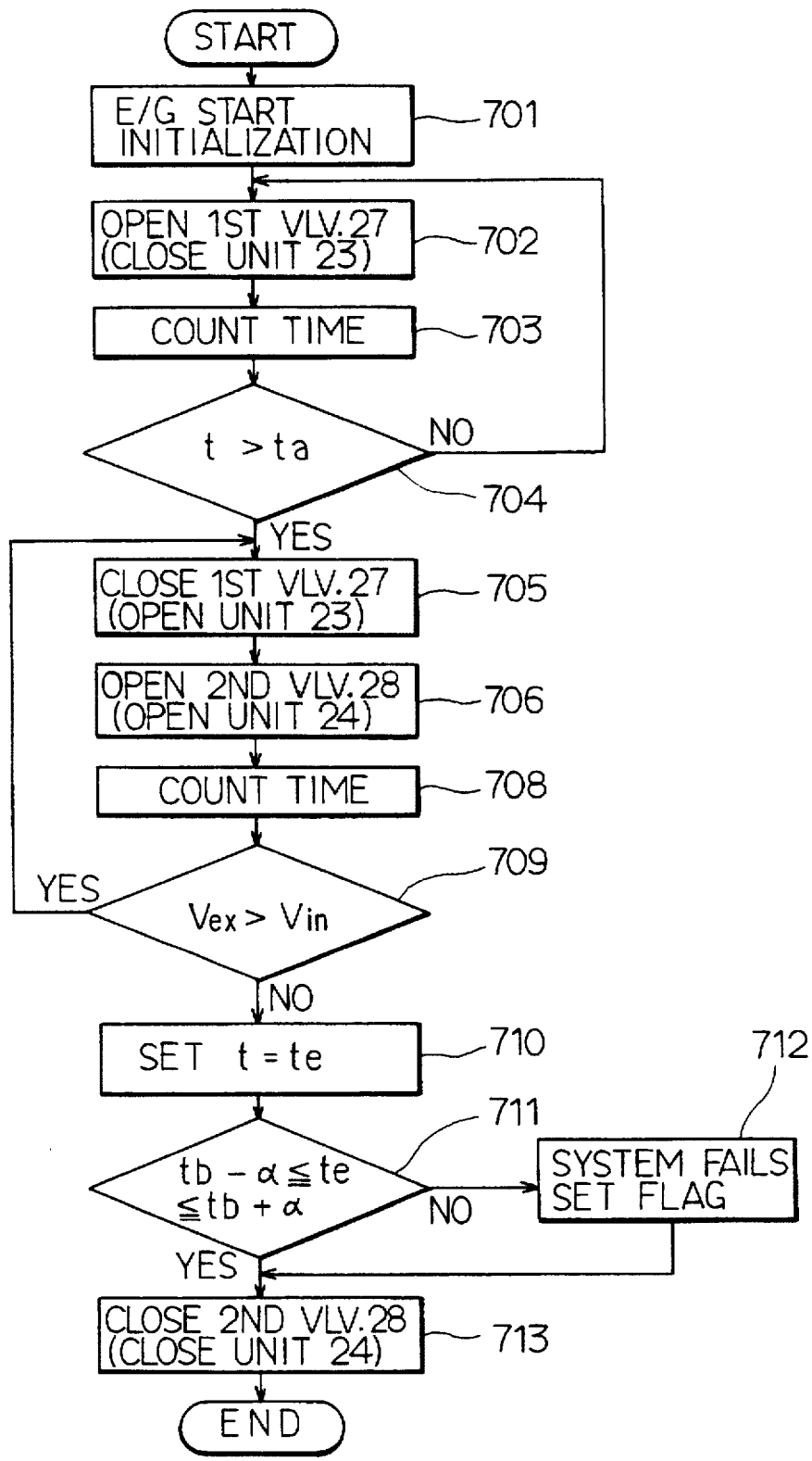
FIG. 28 is a flowchart showing the operational procedure of the exhaust gas purifying apparatus according to Embodiment 6.

Next, the operational procedure of the exhaust gas purifying apparatus 1 is described with reference to the system block diagram in FIG. 26 and the flowchart shown in FIG. 28.

At step 701, the engine 51 is started (an ignition switch is turned on). At step 602, the ECU 40 opens the first solenoid valve 27 to enable the inlet pipes 361, 362 to communicate with each other.

As a result, a negative pressure from the surge tank 53 acts on the operating member 14 to pull the shaft 141, thereby placing the first opening and closing unit 13 in the position shown by the broken line (a closing operation).

Immediately after the engine 51 has been started, the temperature of the exhaust gas is low, and the engine 51 discharges an exhaust gas containing a large amount of cold HC. While the temperature of the exhaust gas is low, the catalyst has not reached the activation temperature, and the cold HC virtually flows through the second passage without being purified by the catalyst device 11.

The temperature of the exhaust gas is monitored by the temperature sensor 43.

During low temperatures, the exhaust gas flows from the adsorbent (zeolite) carrying layer 229 (FIG. 2) of the adsorbing device 22 to the non-adsorbent-carrying layer 220 thereof, and is adsorbed by the adsorbent.

After passing through the adsorbing device 22, the exhaust gas free from the cold HC is emitted to the atmosphere via a muffler.

Since the exhaust gas flowing through the adsorbing device 22 is straightened by the straightening vane 225, as described above, it passes through the device 22 with a uniform flow distribution.

In the meantime, the ECU 40 counts the time (t) after the activation of the first solenoid valve 27, as shown in step 703. As shown in step 704, the engine 51 warms up. When the specified period of time ta required by the exhaust gas to exceed the operating temperature of the adsorbent passes (t>ta), the ECU 40 closes the first solenoid valve 27, at step 705.

This stops the supply of a negative pressure to the operating member 14, and the urging force of the spring 149 causes the shaft 141 to be pushed out. As a result, at step 705, the first opening and closing unit 23 recovers to the position shown by the solid line in FIG. 26 to open the second main passage 32 and to close the adsorbing passage 33.

At the time t (>ta) at step 705, the catalyst device 11 reaches the activation temperature, as described above. The HC in the exhaust gas is then purified by the catalyst device 11 and the exhaust gas almost free from HC is emitted to the atmosphere via the second main passage 32.

In this manner, the exhaust gas purifying apparatus 1 according to this embodiment can significantly reduce the discharge of HC.

After the first solenoid valve 27 is opened at step 708, the solenoid valve 28 is opened, as shown in step 706. The inlet pipe 371 is placed in communication with the surge tank 53, which then supplies a negative pressure to the second opening and closing unit 24. The second opening and closing unit 24 is thus opened.

The timer then starts counting again, as shown in step 708.

On the side of the adsorbing device, the exhaust gas that has already become hot is flowing through the second main passage 32, and contacts the adsorbent carrying layer 220 via the opening of the partition wall 223 shown in FIG. 2.

The heat of the exhaust gas is thus transferred very well to the adsorbent carrying layer 220, resulting an increase in the temperature of the adsorbent to facilitate the desorption of HC.

At this point, since the second opening and closing unit 24 is already open, as described above, exhaust pulses generated in the exhaust manifold 52 cause the one-way valve 25 to be opened intermittently.

Figure 27:
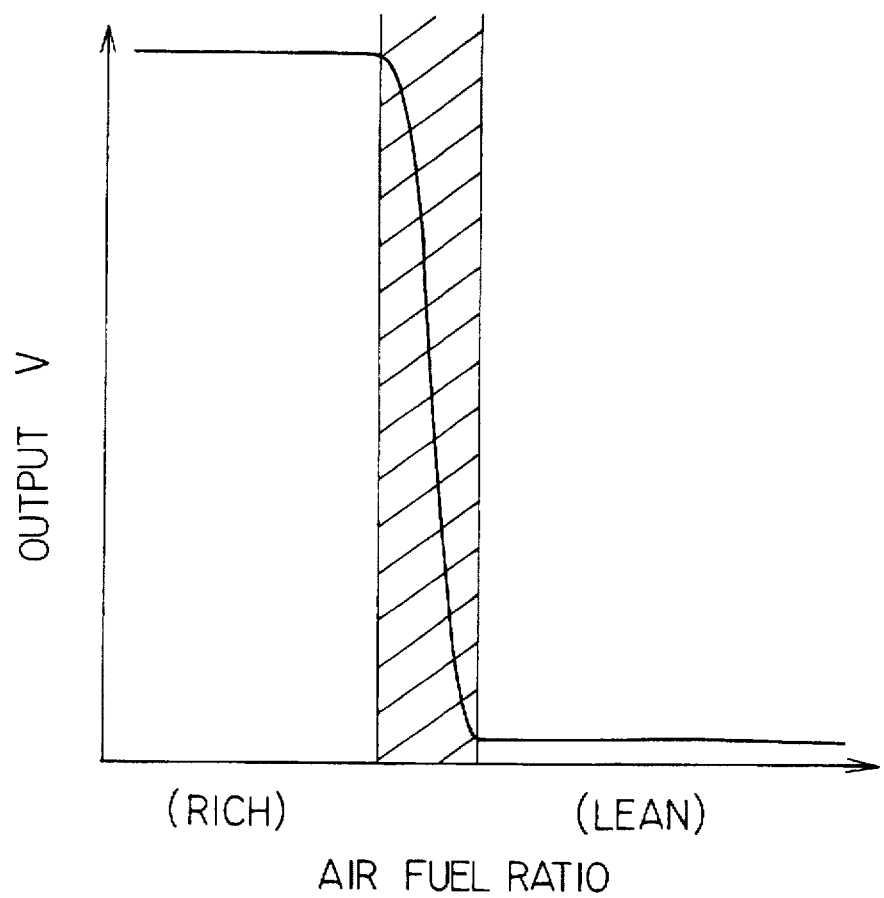
FIG. 27 is a characteristic chart for an oxygen concentration sensor according to Embodiment 6.

This causes the HC desorbed from the adsorbent in the adsorbent carrying layer 220 of the adsorbing device 22 to flow into the exhaust manifold 52 via the return passage 35. The outputs from the oxygen concentration sensors are much larger when the air/fuel ratio is large (lean) than when the same ratio is small (rich), as shown in FIG. 27.

Consequently, the output (Vex) of the oxygen concentration sensor 121 installed in the return passage 35 constantly has a larger value than the output (Vin) of the oxygen concentration sensor 122 installed on the upstream side of the adsorbing device 22 because an increase in desorbed HC causes the air/fuel ratio to decrease.

Figure 29:
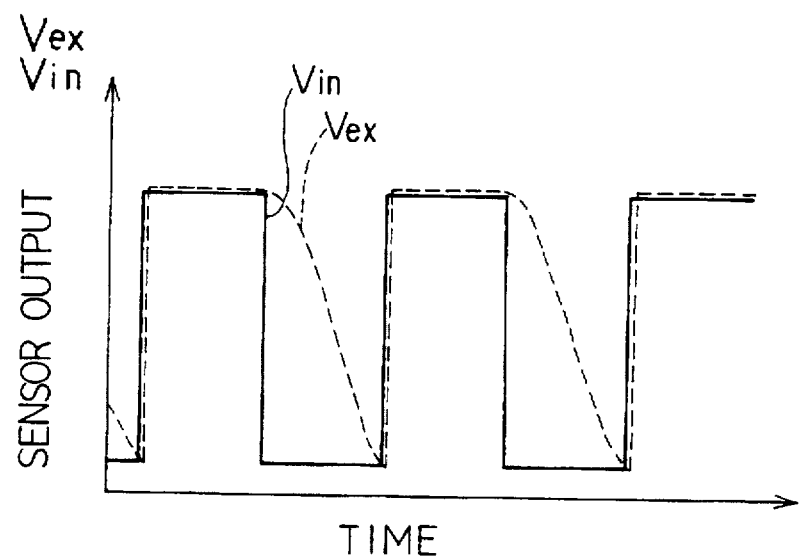
FIG. 29 is a characteristic chart showing the variation of the outputs (Vex, Vin) from the two oxygen concentration sensors before the completion of desorption from the adsorbing device of the exhaust gas purifying apparatus according to Embodiment 6.
Figure 30:
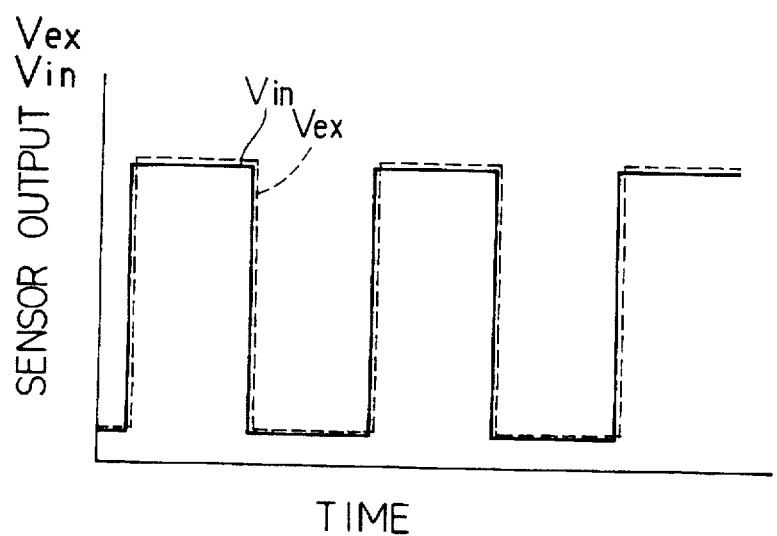
FIG. 30 is a characteristic chart showing the variation of the outputs (Vex, Vin) from the two oxygen concentration sensors after the completion of desorption from the adsorbing device of the exhaust gas purifying apparatus according to Embodiment 6.

When the ratio shifts from the rich side to the lean side, the output vex varies more slowly than the output Vin, resulting in a significant difference between the outputs from both oxygen concentration sensors (FIG. 29). In FIGS. 29 to 32, the solid and broken lines show Vin and Vex, respectively, and the mountain and valley show the rich and lean periods, respectively (see FIG. 27).

Desorbed HC is purified by the catalyst device 11 together with HC discharged from the engine 51.

The comparison of the outputs (Vex, Vin) from the oxygen concentration sensors 121, 122 is continued until Vex>Vin does not hold, as shown in step 709. After the HC desorbed time has passed, the concentration of the exhaust gas on the upstream side of the adsorbing device 22 becomes almost the same as that of the exhaust gas in the return passage 35.

When the outputs from the oxygen concentration sensors 121, 122 become the same, the process proceeds to step 710 to stop the counting of the timer and to set the cumulative value (t) of the timer as a measured period of time te.

At the next step 711, it is determined whether or not the measured period of time te is within a specified range.

It can be generally assumed that the period of time required to completely desorb the gas from the adsorbing device 22 is within a specific time zone (tb−α) to (tb+α) where tb is a central value. Thus, if the measured period of time is within this time zone, the failure determination unit 42 determines that the apparatus is normal, and the process proceeds to step 713.

The reason why the period of time te is measured is as follows:

If the apparatus is operating normally, the gas component desorbed from the adsorbing device is added to the exhaust gas in the channel from the reflux means, resulting in the output of the first gas sensor being larger than that of the second gas sensor while the gas component is being desorbed from the adsorbing device (see FIG. 29). After the desorption of the adsorbed gas has been completed, the outputs from the first and second gas sensors match (see FIG. 30). Thus, if the apparatus is operating properly, the period of time te measured by the time measuring means falls within the specified range of values corresponding to the operational conditions of the engine.

The fault determination means can thus determine whether the period of time te is within the specified range to adequately determine that some fault such as in the adsorbing device or switching means is occurring, if any. This prevents the exhaust gas purifying apparatus from operating for a long duration with a fault uncorrected.

At step 713, the second solenoid valve 28 is closed to close the return passage 35 (the second opening and closing unit 24 is closed).

At step 711, however, if the measured period of time te is not within the time zone (tb−α) to (tb+α), the failure determination unit 42 determines that the apparatus is failed, and at step 722, sets a failure flag and sends a failure signal to relevant sections.

The process subsequently proceeds to step 713 to close the return passage 35.

Causes of the measured period of time te being outside the specified time zone include a failure in the solenoid valves 27, 28 or opening and closing unit 13, 24 which constitute the switching unit, degradation of the adsorbing device 22, and the blinding of the return passage 35.

Figure 31:
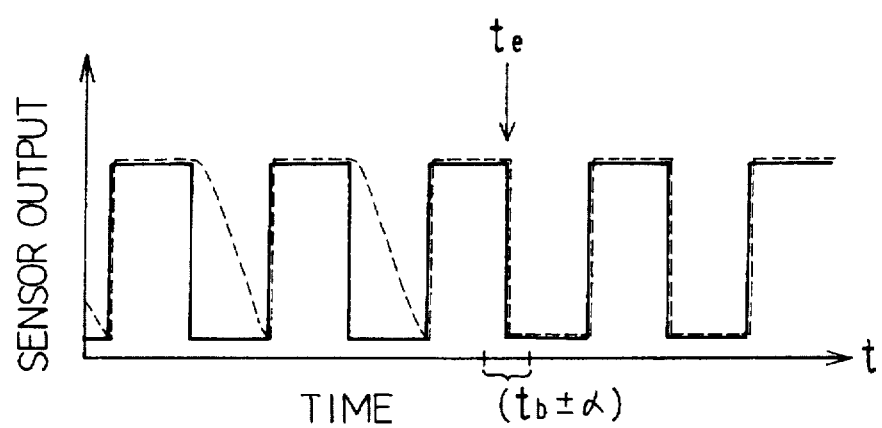
FIG. 31 is a characteristic chart showing the variation of the outputs from the two oxygen concentration sensors during the normal operation of the exhaust gas purifying apparatus according to Embodiment 6.
Figure 32:
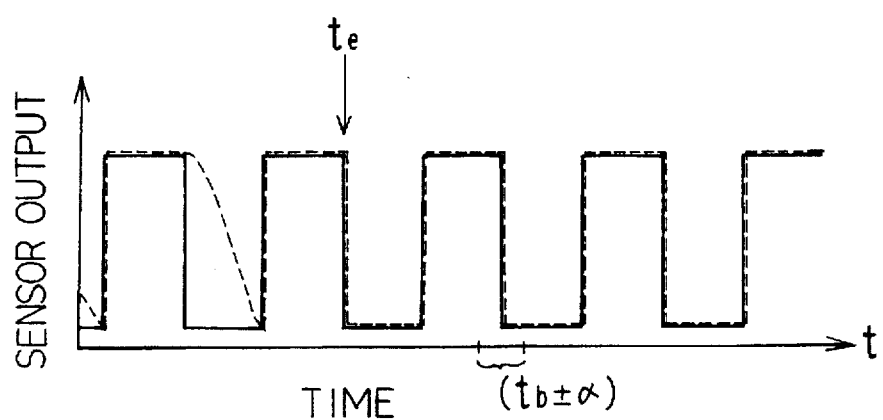
FIG. 32 is a characteristic chart showing the variation of the outputs from the two oxygen concentration sensors during the abnormal operation of the adsorbing device of the exhaust gas purifying apparatus according to Embodiment 6.

When the exhaust gas purifying apparatus 1 is functioning normally, the desorption of HC is completed and the period of time te required by Vex and Vin to match is within the specified range (tb±α), as shown in FIG. 31.

If, however, the exhaust gas purifying apparatus becomes failed and the amount of HC adsorbed is zero, there will be no difference between the outputs from the oxygen concentration sensors 121, 122.

In addition, if the amount of desorption from the adsorbing device 22 is smaller than during normal operation, the difference between the outputs from the oxygen concentration sensors will be eliminated before (tb−α) has passed.

Furthermore, if desorb from the adsorbing device 22 requires a larger amount of time than during normal operation due to the blinding of the return passage 35, the measured period of time te is larger than (tb+α).

As described above, this embodiment can provide the exhaust gas purifying apparatus 1 that can effectively control the emission of the toxic components of an exhaust gas and adequately determine a failure in the apparatus.

[Embodiment 7]

This embodiment is another example of Embodiment 6 wherein an air/fuel ratio sensor is used instead of the oxygen concentration sensors 121, 122.

Figure 33:
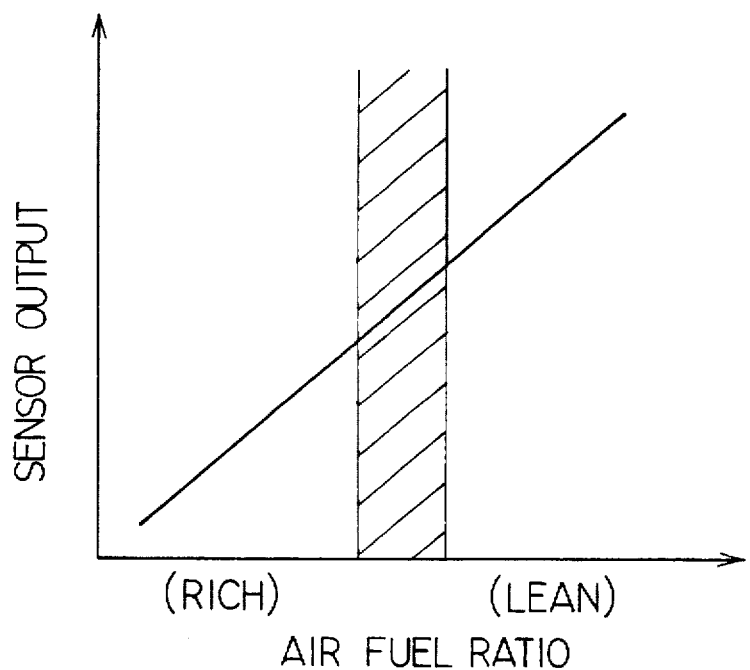
FIG. 33 is a characteristic chart for an air/fuel ratio sensor of an exhaust gas purifying apparatus according to Embodiment 7.

In general, the output from the air/fuel ratio sensor varies slowly relative to the air/fuel ratio, as shown in FIG. 33, instead of varying rapidly within a small range as in the oxygen concentration sensors 121, 122 shown in FIG. 27.

The air/fuel ratio sensor can thus detect a wide range of air/fuel ratios, and identify the ratio even if its varying range varies markedly due to a rapid acceleration, thereby enabling very accurate failure diagnosis.

The other relevant items are similar to those in Embodiment 6.

[Embodiment 8]

This embodiment is another example of Embodiment 6 wherein an HC concentration sensor for detecting the concentration of HC is used instead of the oxygen concentration sensors 121, 122.

Figure 34:
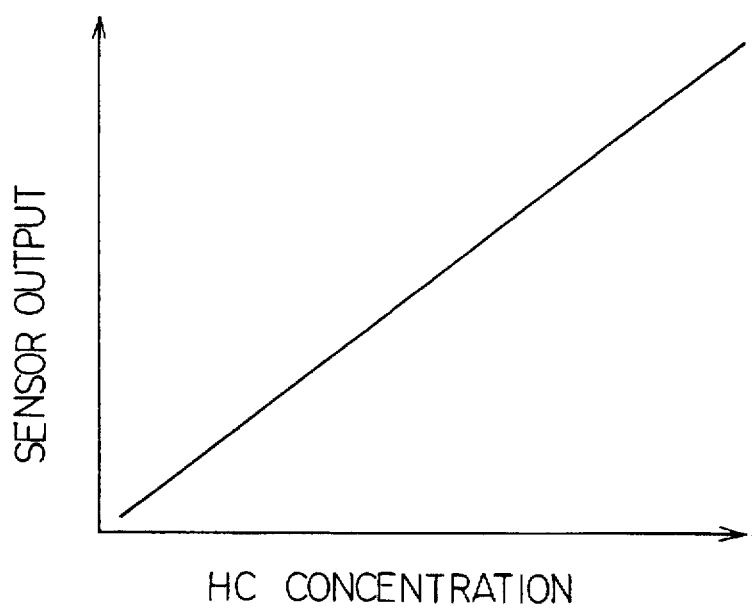
FIG. 34 is a characteristic chart for an HC sensor of an exhaust gas purifying apparatus according to Embodiment 8.
Figure 35:
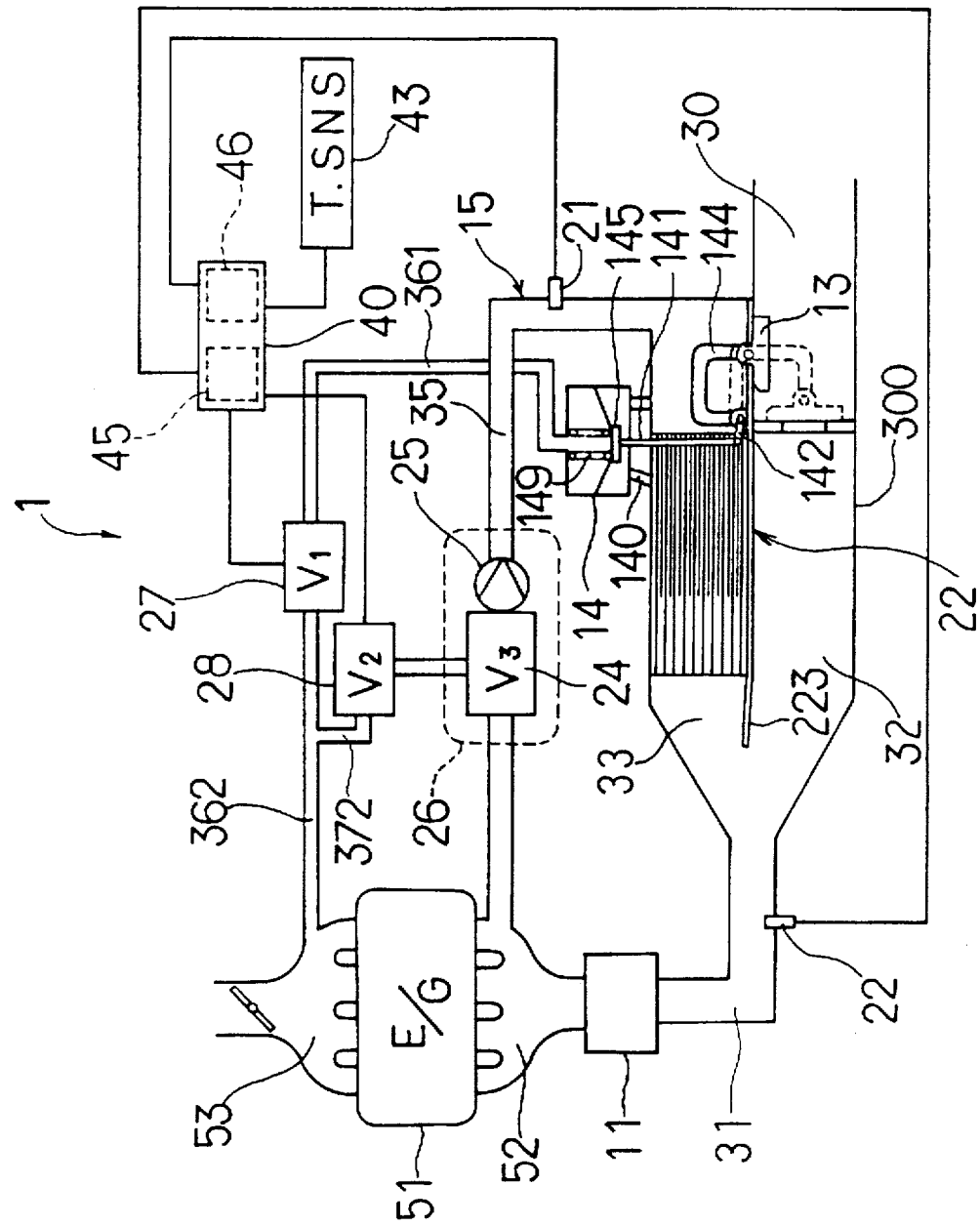
FIG. 35 is a system block diagram of an exhaust gas purifying apparatus according to Embodiment 9.
Figure 36:
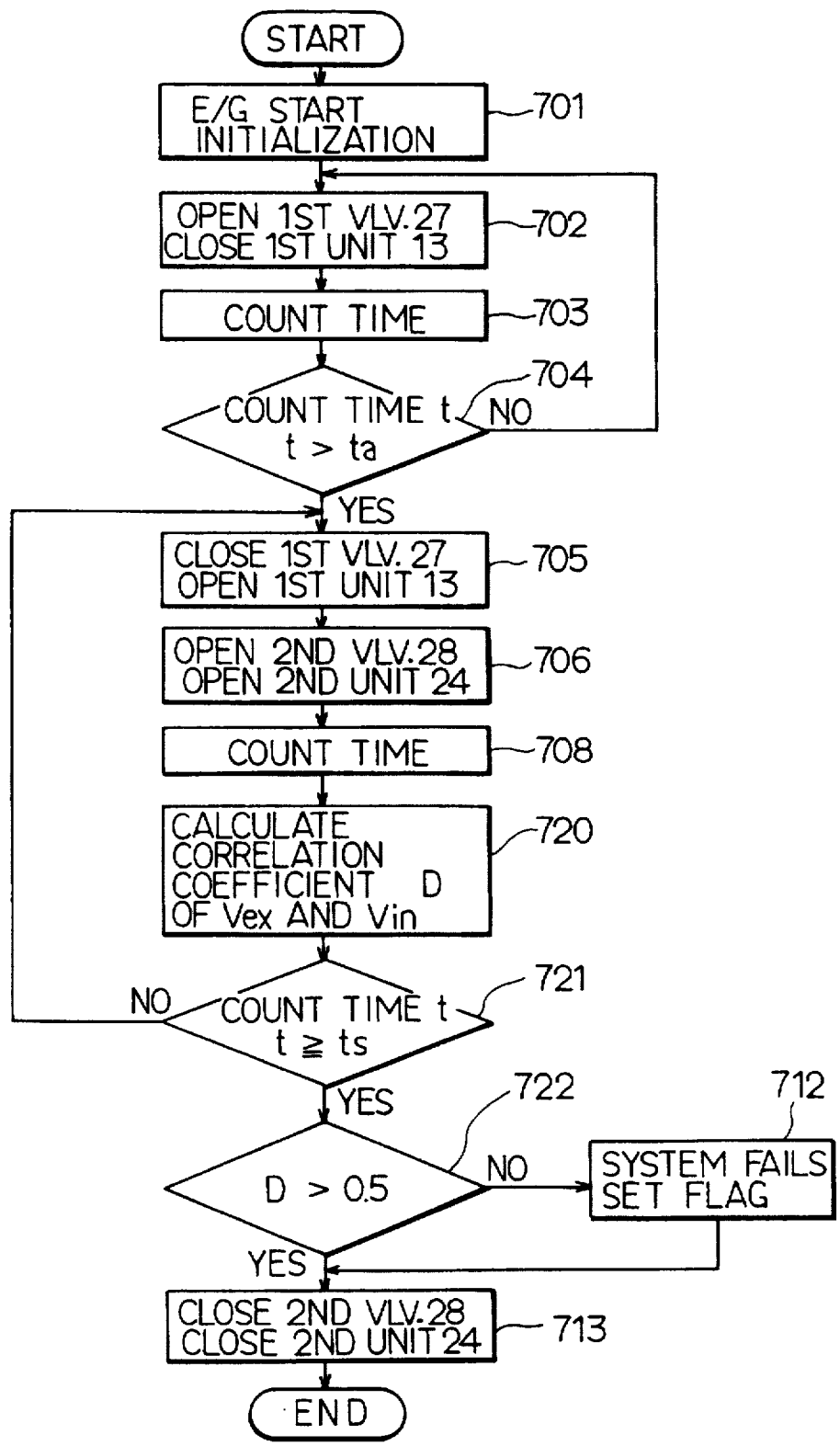
FIG. 36 is a flowchart showing the operational procedure of Embodiment 9.

The output from the HC concentration sensor varies according to the concentration of HC in an exhaust gas, as shown in FIG. 34. The HC concentration sensor thus directly monitors the concentration of HC without being affected by the variation of the air/fuel ratio, and can diagnose failures in the apparatus more accurately than in Embodiments 1 and 2.

The other relevant items are similar to those in Embodiment 6.

[Embodiment 9]

This embodiment is an exhaust gas purifying apparatus 1 according to an embodiment of the second invention. This embodiment is another example of Embodiment 6 wherein a correlation calculation unit 45 and a failure determination unit 46 are provided instead of the time measuring unit 41 and the failure determination unit 42.

The ECU 40 receives the outputs from the first and second oxygen concentration sensors 121 and 122, and the correlation calculation unit 45 calculates a correlation coefficient D for the oxygen concentration sensors 121, 122 after the return passage 35 has been opened. The failure determination unit 46 determines whether or not the apparatus is failed by determining whether or not the correlation coefficient D calculated by the correlation calculation unit 45 within a specified period of time exceeds a specified value.

The operational procedure of the exhaust gas purifying apparatus 1 of this embodiment including the correlation calculation unit 45 and the failure determination unit 47 is described with reference to FIGS. 11 and 22 by focusing on differences from Embodiment 7.

In the flowchart in FIG. 22, the process preceding step 606 in which the return passage 35 is activated is similar to that in Embodiment 6 (FIG. 27), so the description is omitted.

At the next step 708, the timer starts counting after the return passage 35 has been activated.

Next, at step 720, the correlation calculation unit 45 calculates a correlation coefficient D for the outputs Vex, Vin from the first and second oxygen concentration sensors 121 and 122 after the timer has been activated.

The correlation coefficient D can be simply calculated as, for example, the ratio of the average of the products of the outputs from the sensors 121, 122 to the average of squares $Vin^2$ of the output from the second oxygen concentration sensor 122 as follows:

$$D=(Vin \times Vex)(Vin \times Vin)^{-1}$$

The calculation of the correlation coefficient D is continued until a specified period of time ts has passed and desorb from the adsorbing device 22 has been completed.

If the period of time ts has passed in step 721, the process proceeds to step 722.

At step 722, it is determined whether or not the correlation coefficient D obtained before the period of time ts has passed exceeds a specified value, for example, 0.5. If the result of the determination is negative, the failure flag is set at step 722, and the return passage 35 is closed and the control routine is finished at steo 713.

If the correlation coefficient D exceeds the specified value at step 722, it is determined that there is a specified correlation between the outputs from the first and second oxygen concentration sensors 121 and 122 and that the apparatus is normal. Thereafter, at step 713, the return passage 35 is closed and the control routine is completed without setting the failure flag.

The fact that the correlation coefficient D decreases significantly if the exhaust gas purifying apparatus 1 is failed, that is, that a decrease in the correlation coefficient D has a close relation with a failure in the apparatus is shown on the basis of actually measured values.

Figure 37:
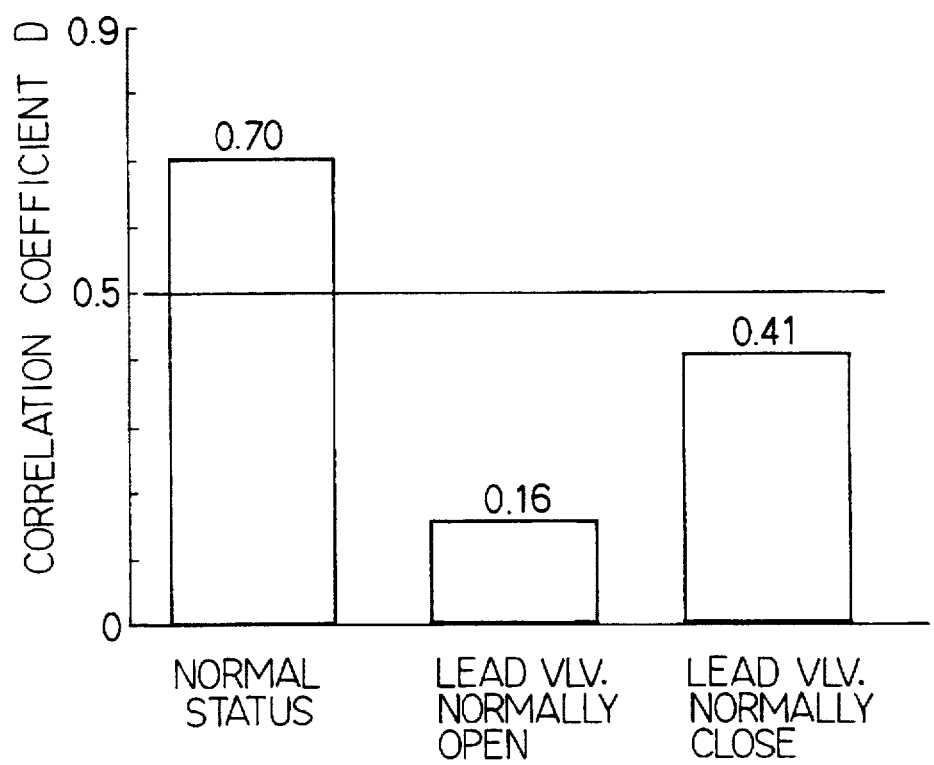
FIG. 37 is a graph showing the value of a correlation coefficient D relative to the outputs from the exhaust gas sensors during the normal and abnormal operations of a reflux means in Embodiment 9.

FIG. 37 shows an actual example of the correlation coefficient D in the normal mode and two failure modes of the lead valve 26.

The correlation coefficient D is 0.7 during the normal mode, which is much larger than the specified value of 0.5, whereas it decreases to 0.16 if the lead valve remains open (due to breakage of the valve section) and to 0.41 if the valve remains close (due to the sticking of the valve section).

That is, if the valve section of the lead valve 26 is broken to cause the return passage 35 to remain open, the dominant flow will be opposite to the return of an exhaust gas during the normal mode, that is, from the exhaust manifold 52 of the engine to the downstream side of the adsorbing device 22. The output Vex from the first oxygen concentration sensor is thus separated from the oxygen concentration on the downstream side of the catalyst device 11 and Vex>Vin holds, but the correlation coefficient D decreases significantly.

In addition, if, for example, the second opening and closing unit 24 of the lead valve 26 remains fully open, the flow of an exhaust gas from the return passage 35 is stopped, and the first oxygen concentration sensor 121 detects the oxygen concentration of an exhaust gas diffused from the adsorbing device 22. The correlation coefficient D for the output Vex and the output Vin from the second oxygen concentration sensor 122 thus decreases (D=0.41).

As described above, a failure in the apparatus can be adequately determined by monitoring the correlation coefficient D.

Other relevant items are similar to those in Embodiment 6.

As described above, this embodiment can provide the exhaust gas purifying apparatus 1 that can effectively control the discharge of the toxic components of an exhaust gas during the normal mode and adequately determine a failure in the apparatus.

Although in these embodiments, the specified period of time ts in step 721 in the flowchart is the period of time required for complete desorption form the adsorbing device 22, the period of time ts may be shorter. For example, the period of time ts may be 10 seconds, and the correlation coefficient may be checked every several tens of seconds in step 722. In this case, if the required conditions are met, the failure flag may be set immediately to provide (display) failure information.

What is claimed is:

1. An exhaust gas purifying apparatus for purifying an exhaust gas discharged from an engine, comprising:

a catalyst disposed downstream of said engine for purifying toxic components in the exhaust gas;

an adsorbing passage disposed downstream of said catalyst;

a main passage disposed downstream of said catalyst and parallel to said adsorbing passage;

a discharge passage disposed downstream of said adsorbing passage and said main passage;

an adsorbing device disposed in said adsorbing passage for adsorbing toxic components in the exhaust gas flowing in said adsorbing passage;

a switching unit for selectively switching an exhaust gas to flow one of said adsorbing passage and said main passage;

a return passage branched from said adsorbing passage and connected said adsorbing passage to an upstream side of said catalyst for returning the toxic components desorbed from said adsorbing device to the upstream side of said catalyst;

a mode control unit for controlling said switching unit to generate an adsorption mode in which said adsorbing passage is opened and said adsorbing device adsorbs the toxic components and a desorption mode in which said main passage is opened and said adsorbing device desorbs the toxic components to flow the desorbed toxic components into said return passage;

a measuring unit for measuring a physical value in the exhaust gas at said adsorbing device or at downstream of said adsorbing device;

a determination unit for comparing said physical value with a predetermined physical value and determining an abnormal status of said adsorbing device and said switching unit.

2. An exhaust gas purifying apparatus according to claim 1, wherein said measuring unit measures an exhaust gas temperature in the exhaust gas during said adsorbing mode.

3. An exhaust gas purifying apparatus according to claim 1, wherein said measuring unit measures a concentration of the toxic components in the exhaust gas during said adsorbing mode.

4. An exhaust gas purifying apparatus according to claim 1, wherein said measuring unit measures a concentration of the toxic components in the exhaust gas during said releasing mode.

5. An exhaust gas purifying apparatus according to claim 4, wherein said measuring unit disposed in said return passage measures a concentration of the toxic components in said return passage during said adsorbing mode.

6. An exhaust gas purifying apparatus according to claim 1, wherein said measuring unit measures an exhaust gas flow in the exhaust gas during said adsorbing mode.

7. An exhaust gas purifying apparatus for purifying an exhaust gas discharged from an engine, comprising:

a first main passage including a catalyst device disposed on an upstream side of an exhaust passage for purifying exhaust gas;

an adsorbing passage disposed in a downstream side of the first main passage;

an adsorbing device for adsorbing toxic substances disposed in said adsorbing passage;

a second main passage disposed in the downstream side of said first main passage so as to form a passage in parallel to said adsorbing passage;

a return passage forming a passage branching from said adsorbing passage and extending to an upstream side of said catalyst device;

a passage opening and closing unit for opening and closing said adsorbing passage, said second main passage and said return passage;

a controller for controlling said passage opening and closing unit;

a failure diagnosis device for self-diagnosing failures in said apparatus; and an one-way valve disposed in said return passage for allowing only a flow of exhaust from said adsorbing passage to the upstream side of said catalyst device;

wherein said controller controls said passage opening and closing unit into a first operation state which closes said return passage, flows the exhaust gas in said adsorbing passage to said discharge passage and blocks a flow of exhaust from said second main passage to said discharge passage, and further controls said passage opening and closing unit into a second operation state which flows the exhaust gas from said second main passage to said discharge passage, opens said return passage, flows the exhaust gas in said adsorbing passage to said return passage and blocks a flow of exhaust gas from said adsorbing passage to said discharge passage, said failure diagnosis device has a measuring unit for measuring a physical value and a determination unit for comparing said measured physical value with a predetermined physical value and determining a failure of said apparatus.

8. An exhaust gas purifying apparatus according to claim 7, wherein said measuring unit measuring a temperature of said adsorption device and said determination unit determining that said apparatus is failed if in said first operation state, the temperature rising speed of the measured temperature is equal to a set value or less and if in said second operation state, the temperature rising speed of the measured temperature is equal to a specified upper limit or more or a specified lower limit or less.

9. An exhaust gas purifying apparatus according to claim 7, wherein said measuring unit measures a flow of an exhaust gas passing through said adsorbing device and said determination unit determining that said apparatus is failed if in said first operation state, said passing flow is equal to a set value or less and if in said second operation state, said passing flow is equal to a specified upper limit or more or a specified lower limit or less.

10. An exhaust gas purifying apparatus according to claim 7, wherein said measuring unit measures concentration of the exhaust gas in said discharge passage and said determination unit determines that said apparatus is failed if the concentration of this gas is more than or equal to set values differing between said first and second operation states.

11. An exhaust gas purifying apparatus according to claim 7, wherein said measuring unit measures concentration of the exhaust gas in said return passage, said failure diagnosis device includes a flow calculating unit for calculating an exhaust flow in said return passage from the operation state of the engine, an accumulation unit for accumulating the total amount of the exhaust gas that has passed through said return passage in said second operation state, and a determination unit for determining that said apparatus is failed if the total accumulated amount of the exhaust gas is equal to a set value or less.

12. An exhaust gas purifying apparatus according to claim 10, wherein said failure diagnosis device has a second determination unit for measuring the temperature of said adsorbing device to determine in the first operation state whether a temperature rising speed of the measured temperature is equal to a set value or more and in second operation state whether said temperature rising speed is equal to a specified upper limit or more or a specified lower limit or less.

13. An exhaust gas purifying apparatus according to claim 10, wherein said failure diagnosis device further has a third determination unit for measuring an exhaust flow passing through said adsorbing device to determine in the first operation state whether said passing flow is equal to a set value or less and in second operation state whether said passing flow is equal to a specified upper limit or more or a specified lower limit or less.

14. An exhaust gas purifying apparatus according to claim 11, wherein said failure diagnosis device has a second determination unit for measuring the temperature of said adsorbing device to determine in the first operation state whether a temperature rising speed of the measured temperature is equal to a set value or more and in second operation state whether said temperature rising speed is equal to a specified upper limit or more or a specified lower limit or less.

15. An exhaust gas purifying apparatus according to claim 11, wherein said failure diagnosis device further has a third determination unit for measuring an exhaust flow passing through said adsorbing device to determine in the first operation state whether said passing flow is equal to a set value or less and in second operation state whether said passing flow is equal to a specified upper limit or more or a specified lower limit or less.

16. An exhaust gas purifying apparatus for purifying toxic substances in exhaust gas discharged from an engine, comprising:

an exhaust passage disposed downstream of said engine to discharge exhaust gas from said engine;

a catalyst device disposed in said exhaust passage upstream side of said exhaust passage for purifying said toxic substances;

a main passage disposed downstream of said exhaust passage;

an adsorbing passage disposed downstream of said exhaust passage and parallel to said main passage;

a discharge passage disposed downstream of said main passage and said adsorbing passage;

an adsorbing device disposed in said adsorbing passage for adsorbing said toxic substances in exhaust gas;

a return passage branched from said adsorbing passage and connected to said an upstream side of said catalyst device;

a switching unit for selectively switching one of said main passage and said adsorbing passage, said switching unit flowing exhaust gas into said main passage if the temperature of exhaust gas is a specified value or lower, and flowing exhaust gas into said adsorbing passage and opening said return passage if the temperature of exhaust gas exceeds the specified value;

exhaust gas sensors disposed in said return passage and said exhaust passage upstream of said adsorbing device for detecting gas components of exhaust gas which varies according to the operation of said adsorbing device;

a time measuring unit for receiving output signals from said exhaust gas sensors and for measuring a period of time from an opening of said return passage caused by output signals from said exhaust gas sensors to a concurrence of said output signals;

a failure determination unit for determining that said apparatus is failed when said measured period of time is outside of a specified range.

17. An exhaust gas purifying apparatus for purifying toxic substances in exhaust gas discharged from an engine, comprising:

an exhaust passage disposed downstream of said engine to discharge exhaust gas from said engine;

a catalyst device disposed in said exhaust passage upstream side of said exhaust passage for purifying said toxic substances;

a main passage disposed downstream of said exhaust passage;

an adsorbing passage disposed downstream of said exhaust passage and parallel to said main passage;

a discharge passage disposed downstream of said main passage and said adsorbing passage;

an adsorbing device disposed in said adsorbing passage for adsorbing said toxic substances in exhaust gas;

a return passage branched from said adsorbing passage and connected to said an upstream side of said catalyst device;

a switching unit for selectively switching one of said main passage and said adsorbing passage, said switching unit flowing exhaust gas into said main passage if the temperature of exhaust gas is a specified value or lower, and flowing exhaust gas into said adsorbing passage and opening said return passage if the temperature of exhaust gas exceeds the specified value;

exhaust gas sensors disposed in said return passage and said exhaust passage upstream of said adsorbing device for detecting gas components of exhaust gas which varies according to the operation of said adsorbing device;

a time measuring unit for receiving signals output by said exhaust gas sensors and measuring a period of time from an opening of said return passage caused by output signals from said exhaust gas sensors to a concurrence of said output signals;

a failure determination unit for determining that said apparatus is failed when said measured period of time is outside of a specified range;

a correlation calculation unit for receiving output signals from said exhaust gas sensors and calculating degree of correlation between said output signals from said exhaust gas sensors within a specified period of time after an opening of said return passage;

a failure determination unit for determining that said apparatus is failed when said degree of correlation fails to reach a specified level.

18. An exhaust gas purifying apparatus according to claim 17, wherein said correlation calculation unit calculates said degree of correlation with using a correlation coefficient.

19. An exhaust gas purifying apparatus according to claim 17, wherein said correlation calculation unit calculates said degree of correlation during an idling state of said engine.

20. An exhaust gas purifying apparatus according to claim 17, wherein said correlation calculation unit calculates said degree of correlation during a deceleration state of a vehicle.

21. An exhaust gas purifying apparatus according to claim 18, wherein said exhaust gas sensors are oxygen sensors.

22. An exhaust gas purifying apparatus according to claim 18, wherein said exhaust gas sensors are air/fuel ratio sensors.

23. An exhaust gas purifying apparatus according to claim 18, wherein said exhaust gas sensors are hydrocarbon sensors.

* * * * *